(12) United States Patent
Commander et al.

(10) Patent No.: US 7,830,627 B2
(45) Date of Patent: Nov. 9, 2010

(54) OPTICALLY VARIABLE DEVICES

(75) Inventors: Lawrence George Commander, Reading (GB); Christopher John Eastell, Berkshire (GB); Roland Isherwood, Hampshire (GB); Brian William Holmes, Hampshire (GB)

(73) Assignee: De La Rue International Limited, Basingstoke, Hampshire (GB)

( * ) Notice: Subject to any disclaimer, the term of this patent is extended or adjusted under 35 U.S.C. 154(b) by 821 days.

(21) Appl. No.: 11/547,614

(22) PCT Filed: Apr. 28, 2005

(86) PCT No.: PCT/GB2005/001618
§ 371 (c)(1),
(2), (4) Date: Nov. 8, 2006

(87) PCT Pub. No.: WO2005/106601
PCT Pub. Date: Nov. 10, 2005

(65) Prior Publication Data
US 2009/0034082 A1     Feb. 5, 2009

(30) Foreign Application Priority Data
Apr. 30, 2004  (GB) ................ 0409783.8
Apr. 30, 2004  (GB) ................ 0409789.5

(51) Int. Cl.
*G02B 7/02*     (2006.01)
(52) U.S. Cl. ........................................... 359/820
(58) Field of Classification Search ............. 359/820
See application file for complete search history.

(56) References Cited

U.S. PATENT DOCUMENTS

| 4,013,465 A | 3/1977 | Clapham et al. |
| 4,856,857 A | 8/1989 | Takeuchi et al. |
| 4,892,336 A | 1/1990 | Kaule et al. |
| 5,248,544 A | 9/1993 | Kaule |

(Continued)

FOREIGN PATENT DOCUMENTS

AU    B-24213/84    8/1984

(Continued)

OTHER PUBLICATIONS

Hutley, et al; (1994); "The moiré magnifier"; Pure Appl. Opt. 3; pp. 133-142.

(Continued)

*Primary Examiner*—Scott J Sugarman
*Assistant Examiner*—Vipin M Patel
(74) *Attorney, Agent, or Firm*—Oliff & Berridge, PLC

(57) ABSTRACT

A security device comprises a substrate (1) having an array of microlenses (3) on one side and one or more corresponding arrays of microimages (4) on the other side. The microimages (4) are located at a distance from the microlenses (3) substantially equal to the focal length of the microlenses. The substrate (1) is sufficiently transparent to enable light to pass through the microlenses (3) so as to reach the microimages (4). Each microimage (4) is defined by an anti-reflection structure on the substrate (1) formed by a periodic array of identical structural elements, light passing through the substrate and impinging on the microimages being reflected to a different extent than light which does not impinge on the microimages thereby rendering the microimages visible.

46 Claims, 42 Drawing Sheets

U.S. PATENT DOCUMENTS

| | | | |
|---|---|---|---|
| 5,442,482 | A | 8/1995 | Johnson et al. |
| 5,503,902 | A | 4/1996 | Steenblik et al. |
| 5,712,731 | A * | 1/1998 | Drinkwater et al. ......... 359/619 |
| 6,062,604 | A | 5/2000 | Taylor et al. |
| 6,089,614 | A | 7/2000 | Howland et al. |
| 6,273,473 | B1 | 8/2001 | Taylor et al. |
| 6,288,842 | B1 | 9/2001 | Florczak et al. |
| 6,381,071 | B1 | 4/2002 | Dona et al. |
| 6,473,238 | B1 * | 10/2002 | Daniell ...................... 359/622 |
| 6,570,710 | B1 | 5/2003 | Nilsen et al. |
| 2002/0051866 | A1 | 5/2002 | Mullen |
| 2002/0054434 | A1 | 5/2002 | Florczak et al. |
| 2003/0179364 | A1 | 9/2003 | Steenblik et al. |

FOREIGN PATENT DOCUMENTS

| | | |
|---|---|---|
| AU | B-63921/86 | 4/1987 |
| EP | 0 238 043 A2 | 9/1987 |
| EP | 0 279 880 A1 | 8/1988 |
| EP | 0 319 157 A2 | 6/1989 |
| EP | 0516790 B1 | 12/1992 |
| EP | 0548142 B1 | 6/1993 |
| EP | 0632767 B1 | 1/1995 |
| EP | 0 698 256 B1 | 2/1996 |
| EP | 0 860 298 A2 | 8/1998 |
| EP | 1141480 B1 | 10/2001 |
| WO | WO 83/00659 A1 | 3/1983 |
| WO | WO 92/04692 A1 | 3/1992 |
| WO | WO 92/11142 A1 | 7/1992 |
| WO | WO 93/24333 A1 | 12/1993 |
| WO | WO 97/47478 A1 | 12/1997 |
| WO | WO 98/15418 A1 | 4/1998 |
| WO | WO 98/25236 A1 | 6/1998 |
| WO | WO 99/01291 A2 | 1/1999 |
| WO | WO 99/28852 A1 | 6/1999 |
| WO | WO 00/39391 A1 | 7/2000 |
| WO | WO 01/23943 A1 | 4/2001 |
| WO | WO 01/63341 A1 | 8/2001 |
| WO | WO 03/095188 A2 | 11/2003 |

OTHER PUBLICATIONS

Amidror; (2000); "The Theory of the Moiré Phenomenon"; Kluiver Academic Publishers; ISBN 0-7923-5949-6.

Renesse, et al; (2004); "Optical Security and Counterfeit Deterrence Techniques V"; Proceedings of Electronic Imaging SPIE;. vol. 5310; pp. 321-327.

Herzig, et al; (1997); "Micro-optics. Elements, systems and applications"; Institute of Micortechnology; pp. 128-177.

Lalanne, et al; (2003); "Artificial Media Optical Properties—Subwavelength Scale"; Encyclopedia of Optical Engineering; pp. 62-71.

Michel, et al; (2001); "Printing meets lithography: Soft approaches to high-resolution patterning"; IBM J. Res & Dev; vol. 45 (5) pp. 697-719.

* cited by examiner

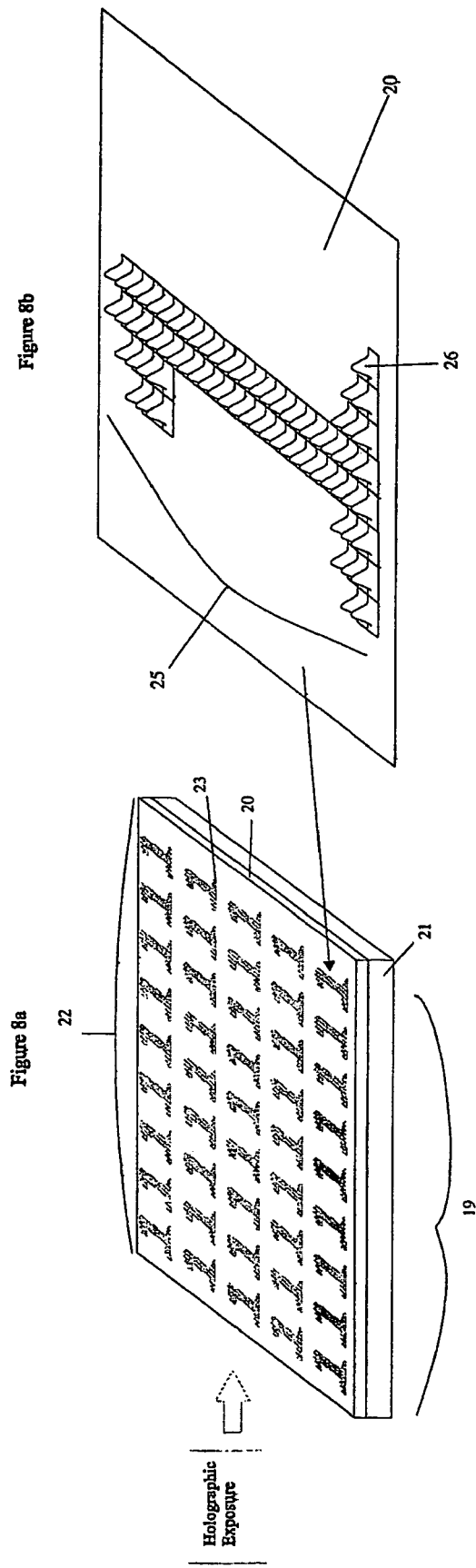

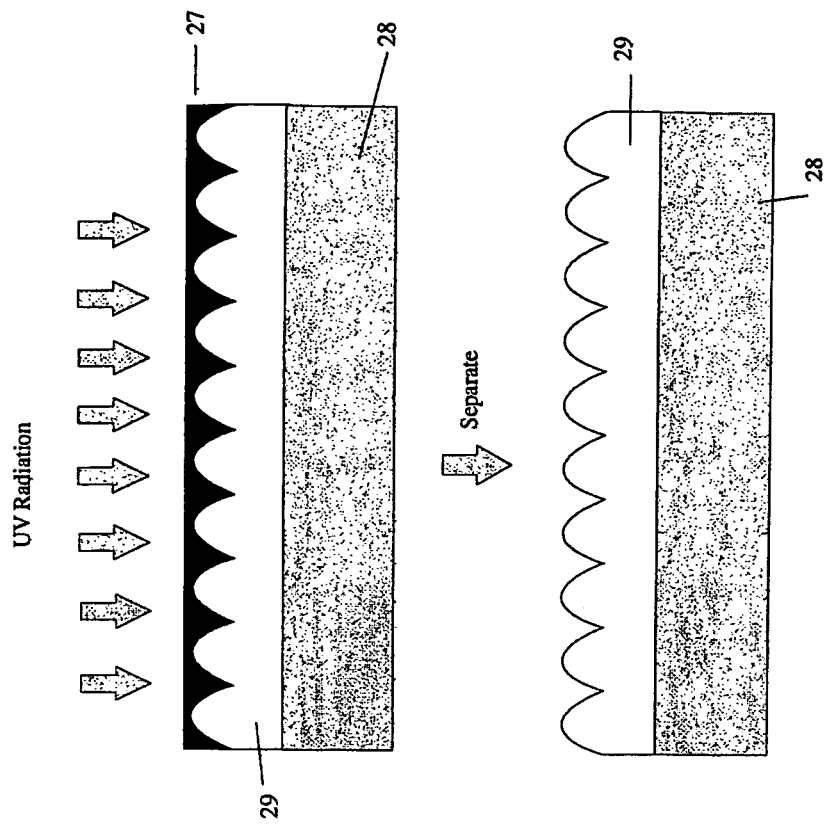
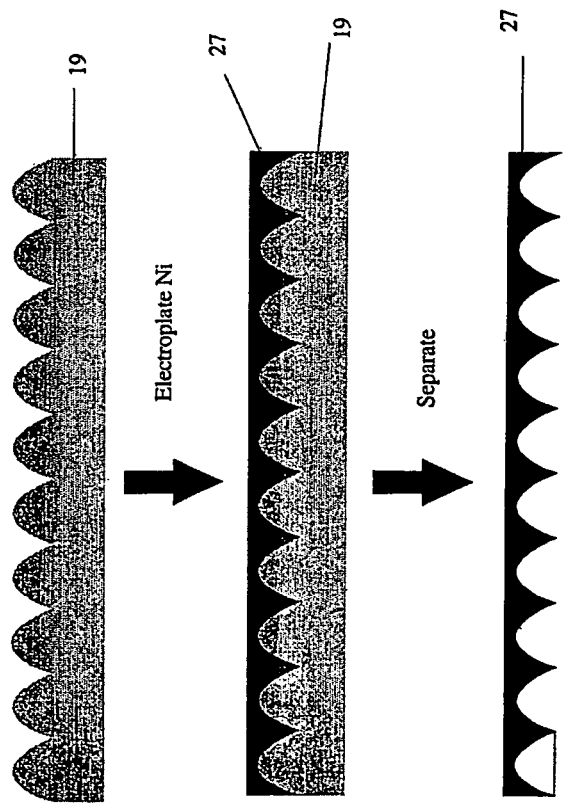

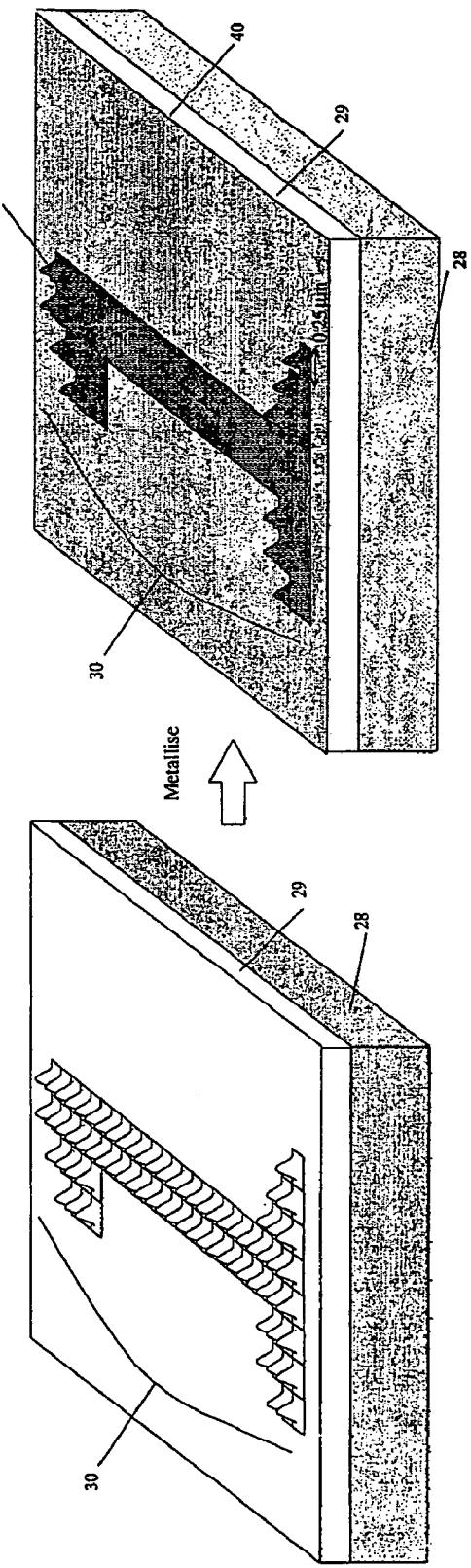
Figure 10a
Figure 10b
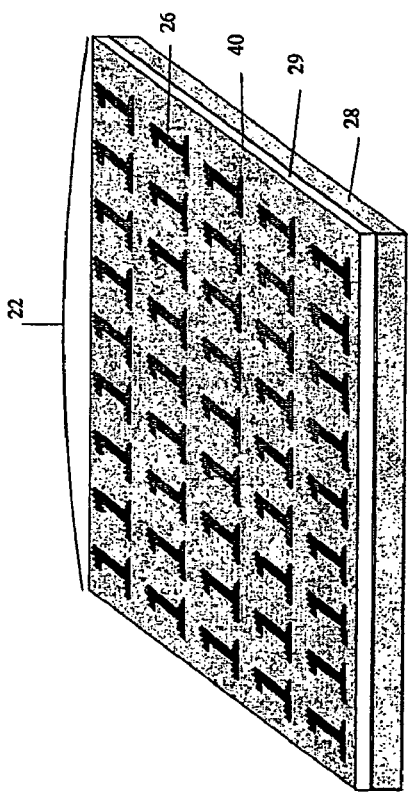
Figure 10c

Vertical Tilt
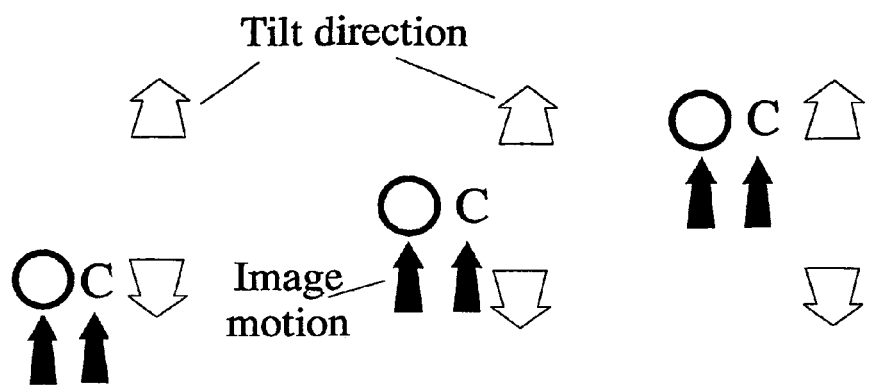
Horizontal Tilt
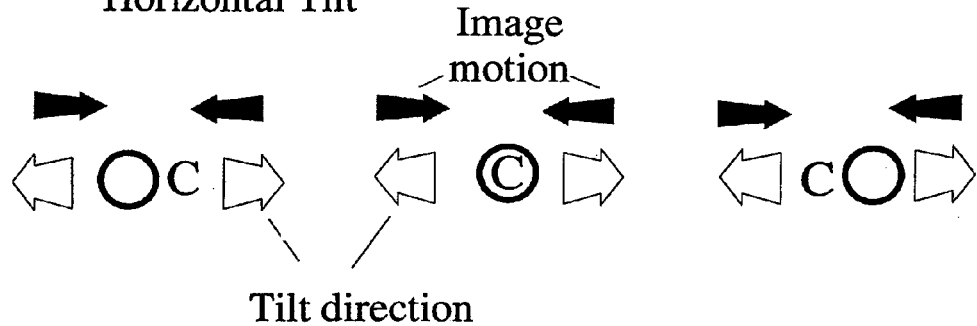
Figure 35

magnified Image "E"
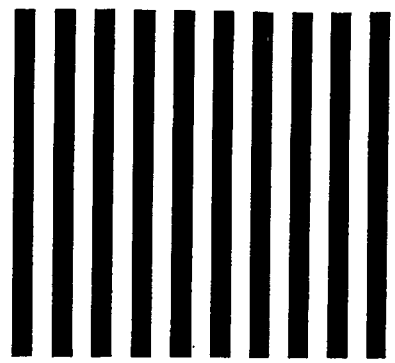
magnified image of lines
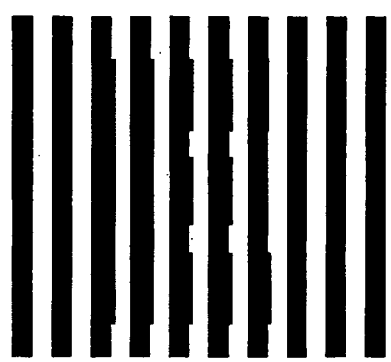
magnified images in phase
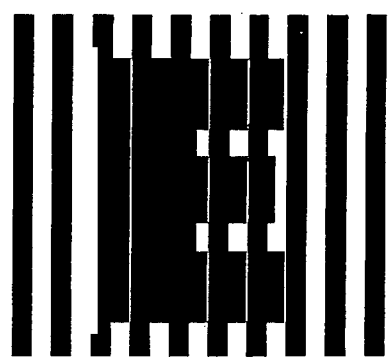
magnified images out of phase
Figure 38 microimage

2nd order moire image
(not to scale)

microimage

2nd order moire image
(not to scale)

OPTICALLY VARIABLE DEVICES

The present invention relates to improvements in methods of manufacture of substrates that can be used in varying shapes and sizes for various authenticating or security applications, particularly a thin optically variable security device utilising non-holographic micro-optical structures.

BACKGROUND

Security documents such as banknotes now frequently carry optically variable devices such as diffraction gratings or holographic optical microstructures as a security feature against copy and counterfeit. This has been motivated by the progress in the fields of computer-based desktop publishing and scanning, which renders conventional security print technologies such as intaglio and offset printing more prone to attempts to replicate or mimic. Examples of such holographic structures and their manufacturing techniques can be found in EP0548142 and EP0632767 filed in the name of De La Rue Holographics Ltd.

The use of diffraction gratings or holographic optical microstructures has become more prevalent in recent years and consequently the underlying component technologies/sciences have become increasingly accessible to would be counterfeiters.

Optically variable devices can also be created using non-holographic micro-optics. One advantage is that mechanical copying of micro-optical components, such as spherical or cylindrical microlenses, typically with a size range of 1-50 µm, is very difficult to achieve because any variation in dimension or geometrical distortion leads to a decline or extinction of the required optical properties. Arrays of cylindrical lenses in combination with interlaced image strips have been routinely used in the packaging and advertising industries to create autostereoscopic and dynamic images. These are known in the industry as lenticular images.

Security devices utilising lenticular images have been described in the literature. U.S. Pat. No. 4,892,336 describes a security thread which has a printed pattern on one side and a lenticular structure coordinated with the printed pattern on the other side which combine in such a way that when the document is turned about an axis parallel to the cylinder lenses, a motif moves almost continuously from one place on the security thread to another.

The prior art discussed above uses cylindrical lens arrays. The use of cylindrical lenses limits the optically variable nature of the device in that the associated movement or change of image only occurs when the viewpoint rotates about the long axis of the lens.

Lenticular images are further limited by the requirement for precise register between the microlenses and the printed images and they are therefore very difficult to manufacture using mass production techniques, which provides a barrier to using them commercially.

A practical problem with lenticular devices is that the thickness is dependent on the width and number of the interlaced image strips. Referring to FIG. 1 in order for the device to function the back focal length, f, of the lens 10 must be such that it focuses on the image strips A,B,C and the repeating period, p, of the image strips must be the same as the lens diameter, D. The back focal length 11 of the lens is defined as the distance from the back surface of the lens to the focal point 12. As a general guide for polymer films $f \sim \geq 1-1.5 \times D$. Therefore for a device to be 30 µm thick the lens diameter must be no greater than 30 µm. Consequently, the repeat period for the image strip would have to be no more than 30 µm. This is not practical with conventional printing techniques such as gravure, lithography and intaglio which can at best achieve resolutions of 20 µm/pixel correlating to ~1200 dpi. Commercially available lenticular devices are therefore relatively thick (>150 µm) and this has prevented their use on/in flexible security documents such as banknotes where devices typically have thicknesses in the range 1-50 µm.

The use of moiré magnifiers for the creation of security devices is known. U.S. Pat. No. 5,712,731, filed in the name of De La Rue International Limited, discusses that combinations of microlenses and microimages can be used to generate security devices exhibiting optically variable effects. In the simplest case of a small pitch mismatch between the lens arrays and image arrays, an array of magnified images of constant magnification is observed with motion resulting from the normal parallax of a lens. A pitch mismatch between a microlens array 14 and a microimage array 13 can also conveniently be generated by rotating the microimage array 13 relative to the microlens array 14 or vice-versa, such that the microlens and microimage array have a rotational misalignment, as shown in FIG. 2. The rotational misalignment or the small pitch mismatch results in the eye observing a different part of the image in each neighbouring lens resulting in a magnified image 15, illustrated in FIG. 2 for the case of rotational misalignment. If the eye is then moved relative to the lens/image array a different part of the image is observed giving the impression that the image is in a different position. If the eye is moved in a smooth manner a series of images are observed giving rise to the impression that the image is moving relative to the surface. In the case where the pitch mismatch is generated by rotational misalignment the array of magnified images is rotated relative to the microimage array and consequently the parallax affect that results in the apparent movement of the magnified image is also rotated and this is known as skew parallax. The effect of pitch mismatch and rotational misalignment on the magnification and rotation of the magnified image observed in a moiré magnifier is described in "The Moiré Magnifier", M. Hutley, R Hunt, R F Stevens and P Savander, Pure Appl. Opt 3 (1994) 133-142 published by IOP Publishing Limited.

The nature of the movement and orientation changes can be explained from the theory of moiré; this is discussed in detail in "The theory of the Moire phenomenon" by I. Amidror published by Kluiver Academic Publishers in 2000, ISBN 0-7923-5949-6. The moiré effect of two periodic structures can be explained/predicted by considering the frequency vectors of the two structures. The orientation of the frequency vector represents the direction of the periodicity and the length represents the frequency (i.e. 1/Period). The vector is expressed by its Cartesian coordinates (u,v) where u and v are the horizontal and vertical components of the frequency.

A one-dimensional grating is represented by a pair of points in the frequency plane (strictly, the grating should be a sinusoid to only have two points in the frequency plane). The representation of two one-dimensional gratings, with the same frequency but different orientation as frequency vectors, is shown in FIG. 3. Grating 1 can be represented by the two points $f_1$ and $-f_1$ and grating 2 can be represented by the two points $f_2$ and $-f_2$. The spectrum produced from the convolution of the two frequency representations (grating 3) indicates what moiré frequencies will occur. To be visible, the moiré must be close to the origin (i.e. a low frequency/high period), so the moiré observed from the superposition of the two gratings in FIG. 3 corresponds to $f_1$-$f_2$ and $f_2$-$f_1$ in the frequency plane. For two-dimensional rectilinear gratings, the same principle applies but occurs in the two orthogonal directions at once.

A large magnification corresponds to a low frequency moiré. It can be seen from the frequency representation in FIG. 3 that a low frequency moiré requires a close match of frequency and orientation. It can also be seen in FIG. 3 that the resultant moiré frequency vector is at ~90° to the individual frequency vectors. If instead of two one-dimensional gratings we have a superposition of a microlens array and a microimage array then the resultant moiré frequency vector corresponds to the magnified image array which will be orientated at ~90° to the microlens and microimage arrays. The degree of magnification is dependent on the ratio of the frequency of the microimage over the frequency of the magnified (moiré) image, i.e. $f_{microimage}/f_{moire}$. In the same manner that the orientation of the magnified image is rotated, the parallax affect that results in the apparent movement of the magnified image is also rotated. In this condition tilting the combined lens/image array vertically about the horizontal axis results in a counter intuitive horizontal motion in the magnified image. This is known as ortho-parallactic motion, i.e. motion perpendicular to the normal direction of the parallax and has been discussed in relation to security devices in a conference paper by Nanoventions, Inc in Proc. of SPIE-IS&T Electronic Imaging SPIE Vol. 5310 p 321-327.

U.S. Pat. No. 5,712,731 discloses the use of the microlens array as a separate device for viewing the associated microimage or as one fully bonded device. However it is not possible to produce microimages at a sufficiently small scale to create a thin (<50 μm) fully bonded flexible device using the printing or embossing techniques disclosed in U.S. Pat. No. 5,712,731.

An alternative approach to forming high-resolution black and white images is described within U.S. Pat. No. 5,503,902 filed in the name of Applied Physics Research, L.P., and specifically in relation to security devices in patent publication US 20030179364. The images are constructed by using light traps to create the black pixels. The light traps comprise reflective tapered structures with relatively high aspect ratios. Light entering the tapered structure is reflected and approximately 10% of the light may be absorbed. Due to the morphology of the structures the light is reflected many times and in this way all of the light is absorbed by the structure before it has the chance to exit the light trap. The light traps are formed during reactive ion etching of a layer of photopolymer and are a result of impurities/inclusions in the composition of the photopolymer. A master is then generated using conventional photolithographic techniques and the structure is then replicated into a polymer film. This technique allows the creation of black pixels at the limit of optical detection with a resolution of up to 100000 dpi. Arrays of microimages generated from such very fine pixels can be combined with microlenses to form thin flexible security devices of <50 μm producing autostereoscopic and dynamic images. A high-resolution colour image can be created by overprinting the high-resolution black and white image with a transparent lower resolution colour image.

Although the light traps allow the formation of very high resolution identifying images there are a number of processing issues associated with them. The light traps are formed during reactive ion etching as a result of impurities or inclusions in a photopolymer. Therefore the exact structure of each light trap cannot be specified and is not reproducible which could lead to variability in the final image. Once the structures are formed and a master produced the structure must be copied with very high fidelity into polymeric film using a replication process suitable for mass production. The high aspect ratio of the light trap structures (~1:5) can result in difficulties in replicating these structures in polymeric films.

It is known that the fidelity of replicated nanoscale and microscale structures is very dependent on the aspect ratio. In "Micro-optics. Elements, Systems and Applications—Edited by Herzog", it is reported that an aspect ratio of 1:1 can be replicated easily, 1:5 with care and 1:10 only with great difficulty. Diffractive structures used in security holograms have aspect ratios of ~1:1 and are routinely produced at very high production rates (60 m/min) using a continuous hot embossing process. High aspect ratio structures cannot be replicated accurately using this process. UV embossing can be used to replicate such high aspect ratio structures but as the aspect ratio increases the slower and more difficult the process becomes. For a security device to be useful commercially genuine devices must be relatively easy to manufacture since otherwise production cost would be prohibitive. There is therefore a requirement for high-resolution images with high contrast that can be formed from structures that can be replicated with a high fidelity using a commercially cost effective process.

SUMMARY OF INVENTION

In accordance with a first aspect of the present invention, a security device comprises a substrate having an array of microlenses on one side and one or more corresponding arrays of microimages on the other side, the microimages being located at a distance from the microlenses substantially equal to the focal length of the microlenses, the substrate being sufficiently transparent to enable light to pass through the microlenses so as to reach the microimages characterized in that each microimage is defined by an ant-reflection structure on the substrate formed by a periodic array of identical structural elements, light passing through the substrate and impinging on the microimages being reflected to a different extent than light which does not impinge on the microimages thereby rendering the microimages visible.

In accordance with a second aspect of the present invention, a method of manufacturing a security device comprises providing an array of microlenses on one side of a substrate and one or more corresponding arrays of microimages on the other side, the microimages being located at a distance from the microlenses substantially equal to the focal length of the microlenses, the substrate being sufficiently transparent to enable light to pass through the microlenses so as to reach the microimages characterized in that each microimage is defined by an anti-reflection structure on the substrate formed by a periodic array of identical structural elements, light passing through the substrate and impinging on the microimages being reflected to a different extent than light which does not impinge on the microimages thereby rendering the microimages visible.

In accordance with a third aspect of the present invention, a security device comprises a substrate having an array of microlenses on one side and at least two corresponding arrays of microimages on the other side, the images being located at a distance from the microlenses substantially equal to the focal length of the microlenses, the substrate being sufficiently transparent to enable light to pass through the microlenses so as to reach the microimages, wherein the images within each array are the same, but differ from the images in the or each other array, and wherein at least one microimage array is in imperfect registration with the microlens array, the arrangement being such that when the microimages are viewed through the microlens array, moiré magnified versions of the images are visible and, when the substrate is tilted, the magnified images of one array move relative to the magnified images of the or each other array.

The third aspect of the present invention provides improved optically variable devices, based on the interaction between an analysing array of microlenses and a corresponding set of two or more microimage arrays, where the resultant magnified images move on tilting the device to form one completed image.

The first and second aspects of the invention provide an alternative solution for the manufacture of thin optically variable security devices utilising non-holographic micro-optical structures. A new security device is disclosed which combines a microlens and microimage array, on two opposing surfaces of a substrate, typically polymeric film, to form an optically variable device in which a thin structure is achieved by creating high resolution images. Alternatively the micro-image and microlens array can be formed on separate polymeric films, which are subsequently laminated together to generate the optically variable device.

The optically variable device of the current invention is based on the interaction between an analysing array of microlenses and a corresponding set of identical microimages, as described in U.S. Pat. No. 5,712,731. When the corresponding arrays are perfectly aligned into register each lens has underneath it a microimage in perfect register so that an observer sees only one magnified image of the microimages. However introducing a pitch mismatch between the microlens array and the microimage array splits the single magnified image into a regular array of images with the number of visible images increasing and their individual sizes decreasing as the pitch mismatch increases. Essentially the area and unit length over which the lenses and images are substantially in phase to form a visible picture decreases so that the device ceases to display a single image and starts to display an array of much smaller regular images which show the loss of perfect register between the lenses and the microimages. The overlap image areas are essentially determined by the moiré pattern formed between the lens and image arrays and so particular versions of this type of device have been termed the "moiré magnifier". The pitch mismatch can be achieved by simply varying the pitch or preferably by introducing a rotational misalignment between the microimage and microlens array.

In the first and second aspects of the present invention the microimage array is not produced by a printing technique but instead from the optical properties of a, preferably metallised, anti-reflection microstructure. Anti-reflection structures are well known in the field of optics and designed to reduce reflections arising from abrupt changes in the refractive index at the interface of two materials. A periodic array of surface structures that are smaller than the wavelength of light provides a continuous transition of the refractive index rather than an abrupt change, and reflection is minimised. A typical application for such a structure would be as an anti-glare film in flat panel displays. One particular type of submicron anti-reflection structure is known as a moth-eye structure. This is based on the structure observed on the eye of some nocturnal moths that minimises the reflection of light and thereby allows the moths to remain undetected by predators. The moth-eye structure has a repeating period typically in the range 200-400 nm and a height typically in the range 250-35 nm.

Anti-reflection microstructures, typically two-dimensional although one-dimensional structures are also envisaged, including those mimicking the moth-eye structure, can be produced using conventional replication technologies. Holographic exposure can be used to produce a master, which is then used to create a metal tool containing the negative image. The metal tool is then used to replicate the structure in a polymeric film using either a batch or roll-to-roll process.

Although the substrate and ant-reflection structure alone could generate the required microimages in some cases, in preferred embodiments the present invention utilizes the fact that periodic anti-reflection structures appear black when metallised. This was described in "Artificial Media Optical Properties—Subwavelength Scale" published in the Encyclopaedia of Optical Engineering (ISBN 0-8247-4258-3), Sep. 9, 2003, pages 62-71. This property enables the creation of high-resolution images using conventional replication and metallising technologies. In one example an anti-reflection structure would be replicated in a polymer film in the form of an identifying image. On metallising the polymer film the identifying image would appear black as a result of the anti-reflection structures and the non-image, plain metal areas, would appear bright. The resolution of the images will depend on the period of the anti-reflection structure. A moth-eye structured film with a period of 250 nm is available commercially from Autotype and Wavefront Technology Inc, and this would allow a minimum pixel size of 250 nm, which equates to a resolution of 100,000 dpi. An improvement over the prior art is that the identifying images can be replicated in a more straightforward and controlled manner due to the low aspect ratio of the anti-reflection structures. For example the commercially available moth eye structure typically has an aspect ratio in the range 1:0.8-1:2 compared to the much higher aspect ratio of the light traps, ~1:5, described in the prior art.

A further improvement over the prior art is that the master anti-reflection structures are created in a lacquer or photoresist using known holographic or diffraction grating techniques, which allows precise control over the origination of the final high resolution image. As it is a periodic microstructure each pixel is created by an identical microstructure. This contrasts with the light traps, detailed in the prior art, which are formed during reactive ion etching as a result of impurities or inclusions in a photopolymer. The exact structure of each light trap cannot be specified and is not reproducible which could lead to variability in the final image.

In one further aspect of the present invention the incorporation of demetallised indicia in the metallised surface containing the microimage array can further improve the anti-counterfeit nature of the device. This combines the advantages of the optically variable effects generated using a thin moiré magnifier with the advantages of indicia formed from demetallisation. In the field of banknotes, and security elements or threads in particular, the use of demetallised indida such as described in EP 0279880 and EP 319157 has proved to be highly effective in reducing counterfeiting.

A further advantage of the moth-eye anti-reflection structure is that it has a reduced wettability created by a combination of structure and surface energy. This means that an applied liquid will not wet out the surface and will tend to roll off the surface due to insufficient surface tension to hold it in place. This property can be used to create preferential removal of Al on the metallised surface containing the microimage array by contact with a caustic solution of NaOH in water. The caustic solution will wet the non-image plain metal areas but will not wet the metallised moth-eye structure, which forms the identifying image. Under these conditions, the plain areas would then become transparent after demetallisation whilst the moth-eye areas would remain black. The formation of a high contrast, high-resolution black/transparent image enables the thin moiré magnifier device to be used in transmission as well as reflection.

The security device of the current invention can be used to authenticate a variety of substrates but is particularly suitable for application to flexible substrates such as paper and in particular banknotes (where the device could define a patch or a thread). The thickness of the security device depends on how it is employed within the banknote. For example as a patch applied to a banknote the desired thickness will range from a few microns for a hot stamped patch up to ~50 μm for label applications. In the case of a windowed security thread the security device would typically have a final thickness in the range 20-50 μm. Thicker versions of the security device (up to 300 μm) could be employed in applications which include passport paper pages, plastic passport covers, visas, identity cards, brand identification labels, anti-tamper labels-any visually authenticable items.

Some examples of security devices and methods according to the invention will now be described with reference to the accompanying drawings, in which.

Figure 4:
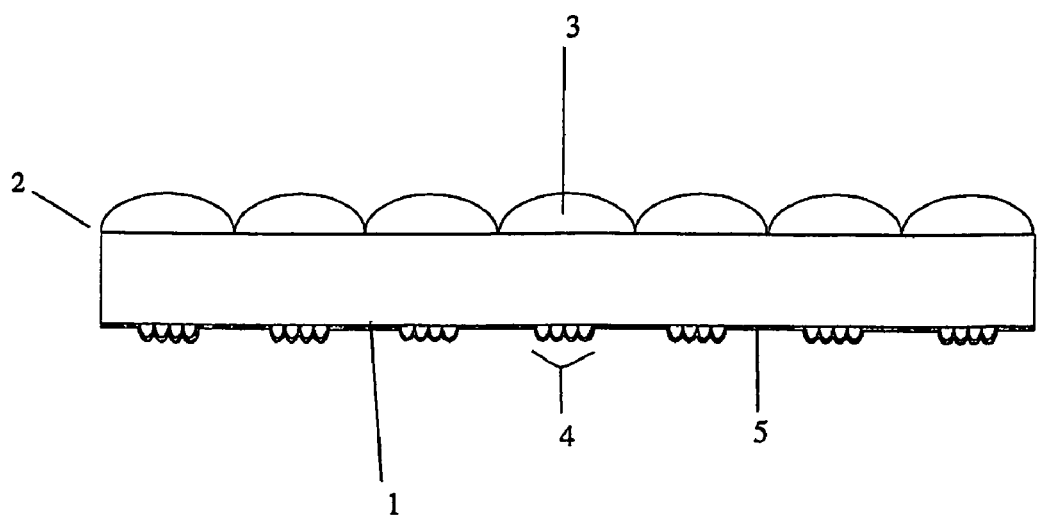
FIG. 4 illustrates schematically in cross-section a first example of a security device according to the invention.
Figure 6:
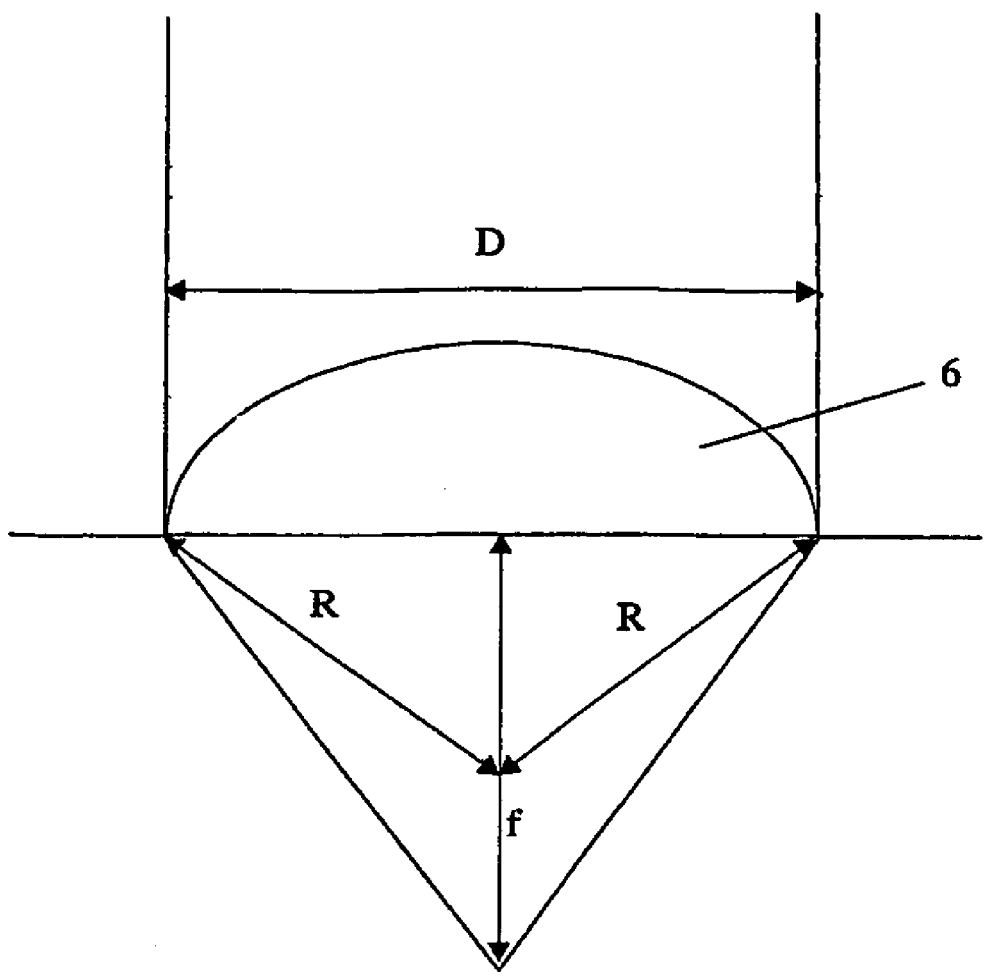
Figure 7:
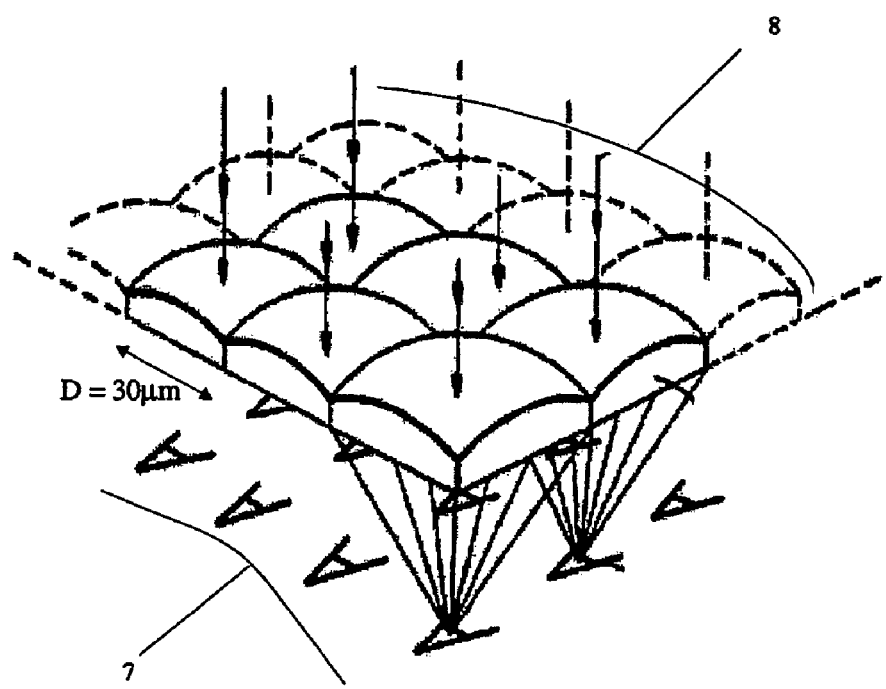
Figure 11B:
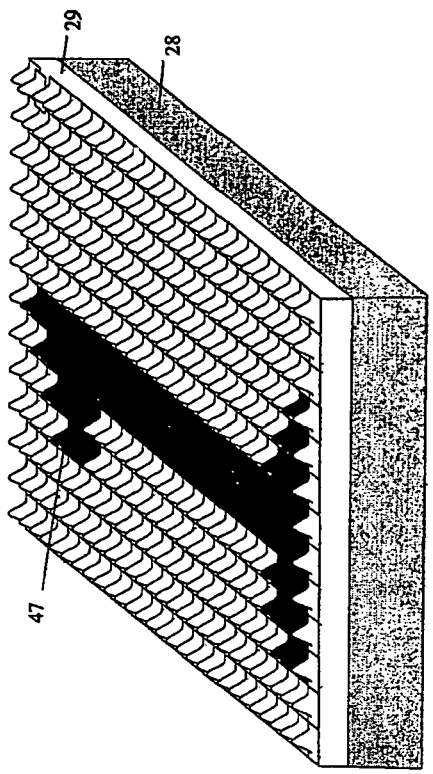
Figure 11A:
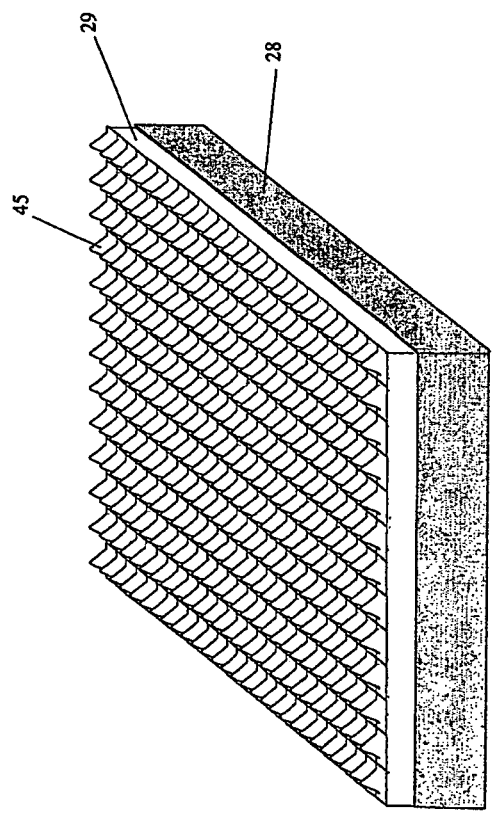
Figure 12:
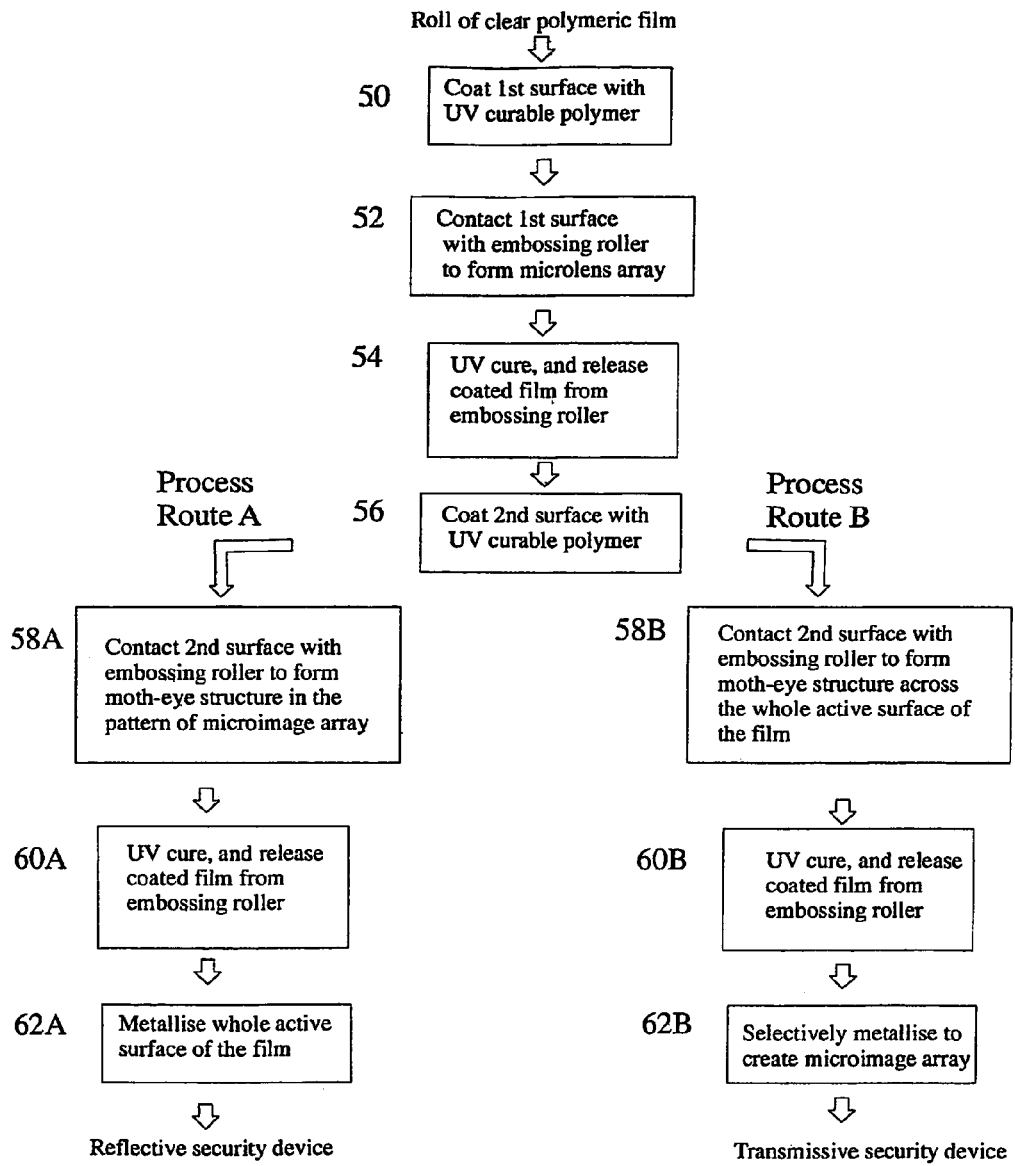
Figure 13:
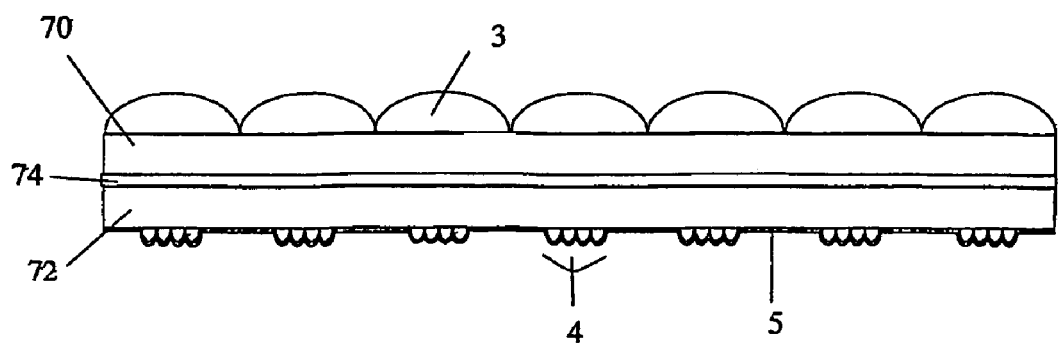
Figure 14:
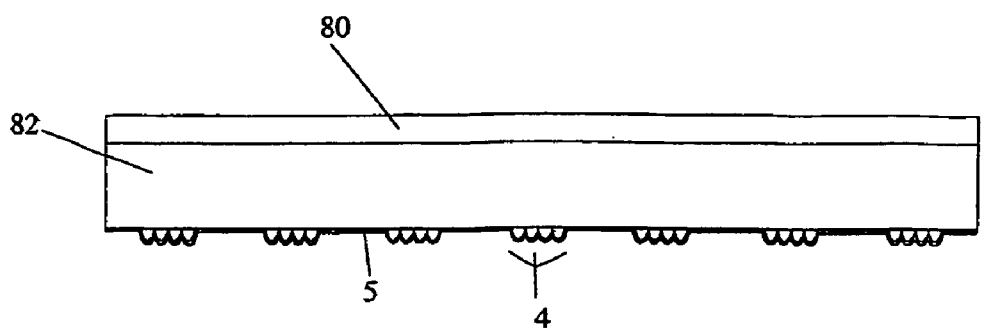
Figure 15:
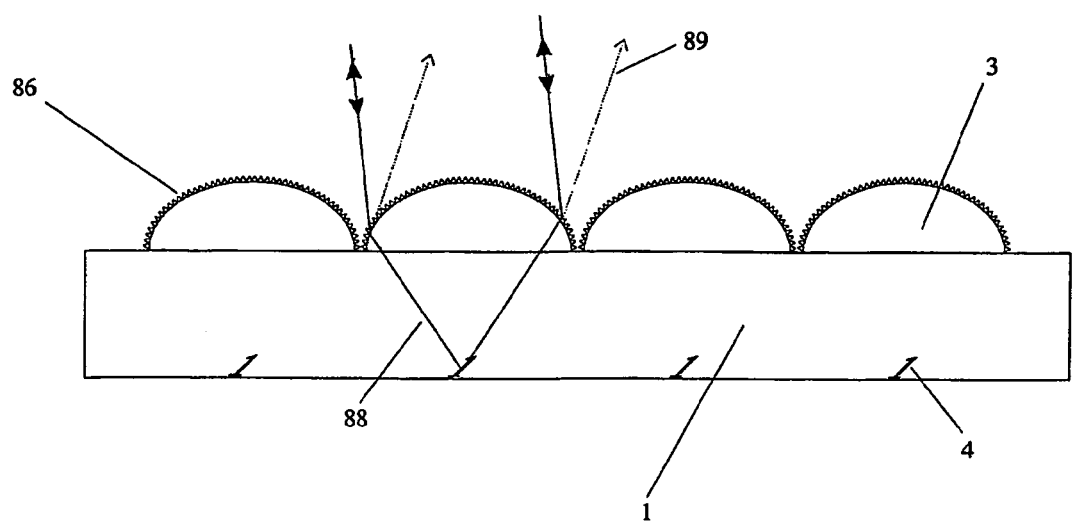
Figure 16A:
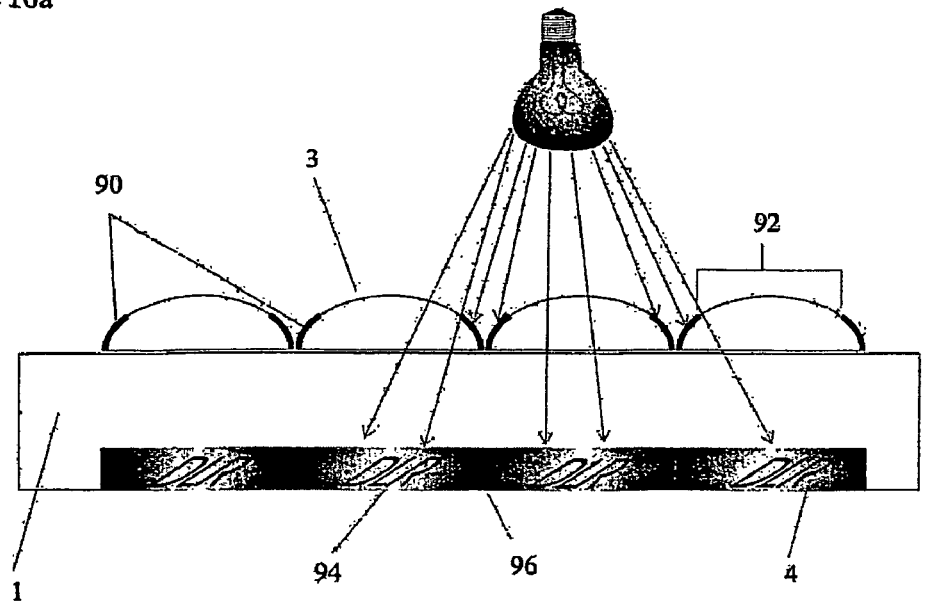
Figure 16B:
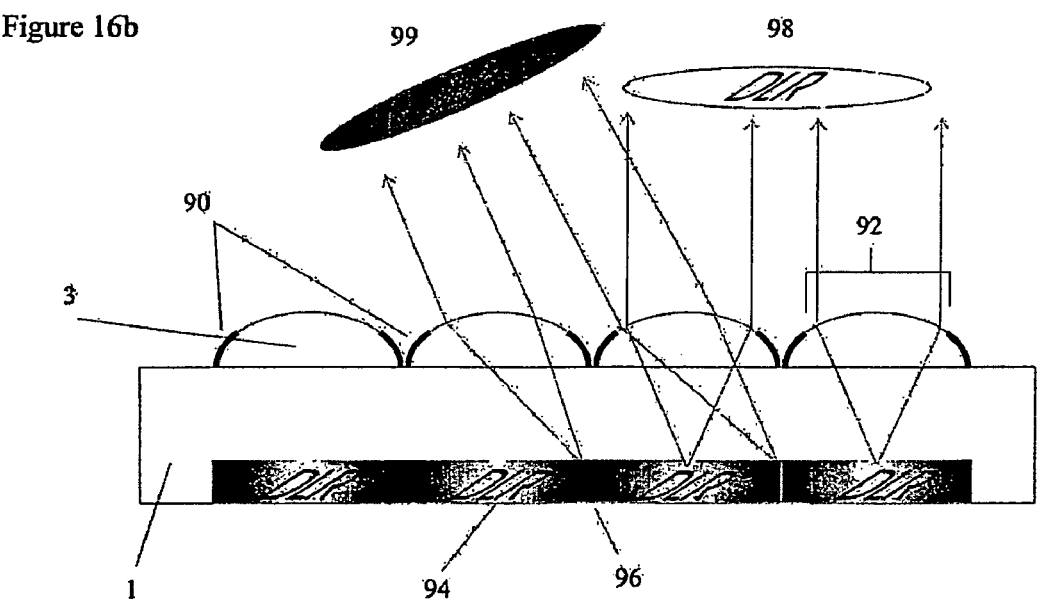
Figure 17:
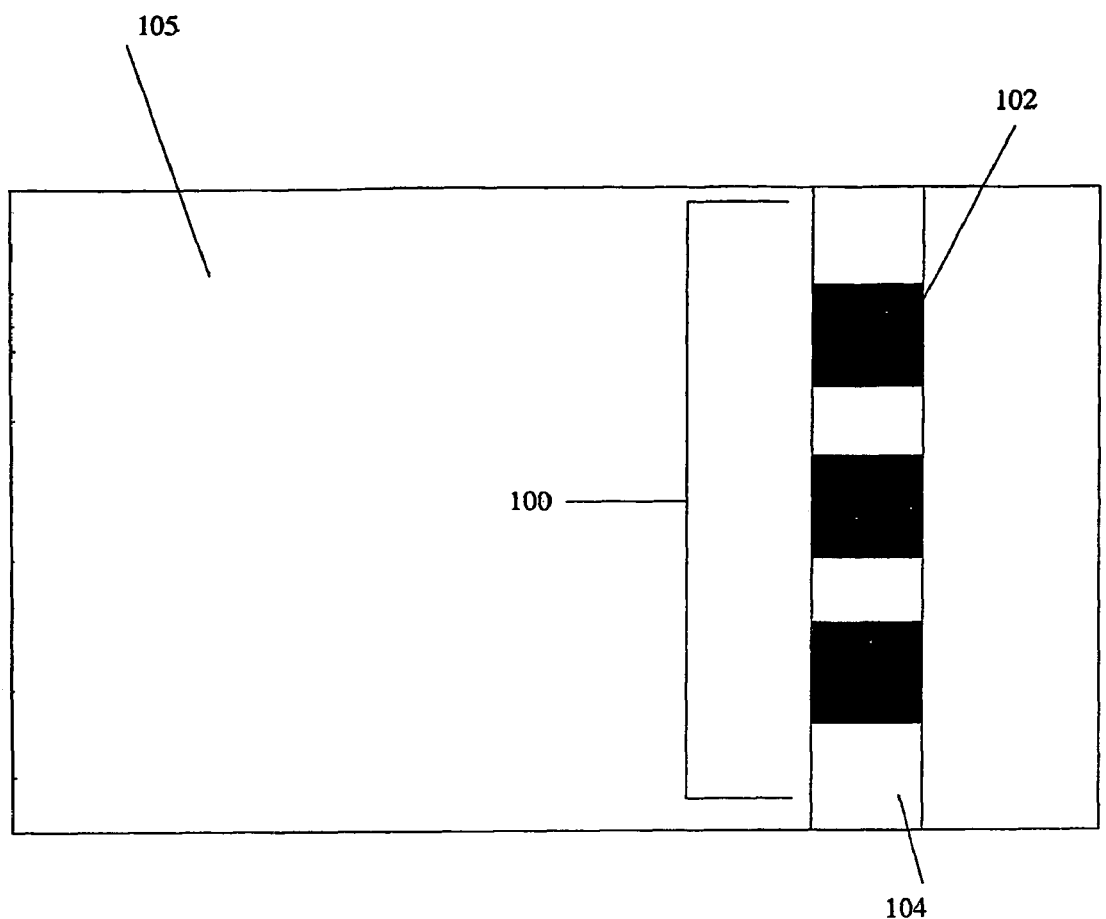
Figure 18:
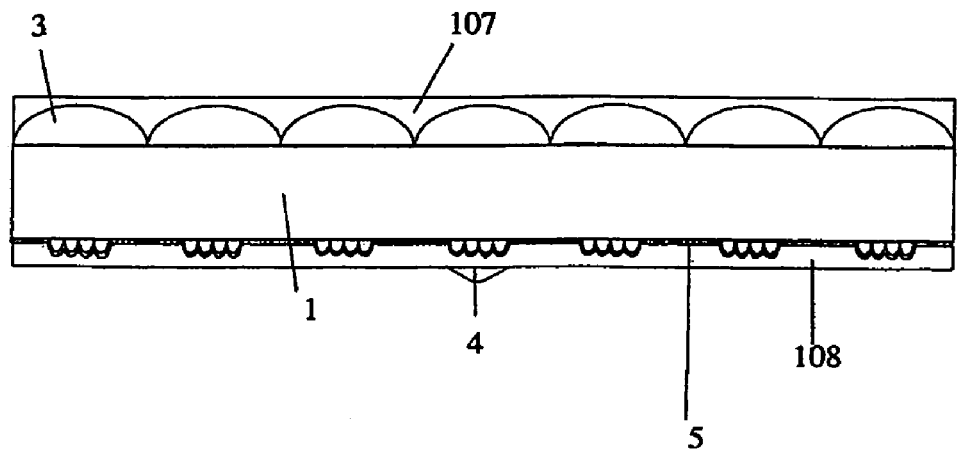
Figure 18:
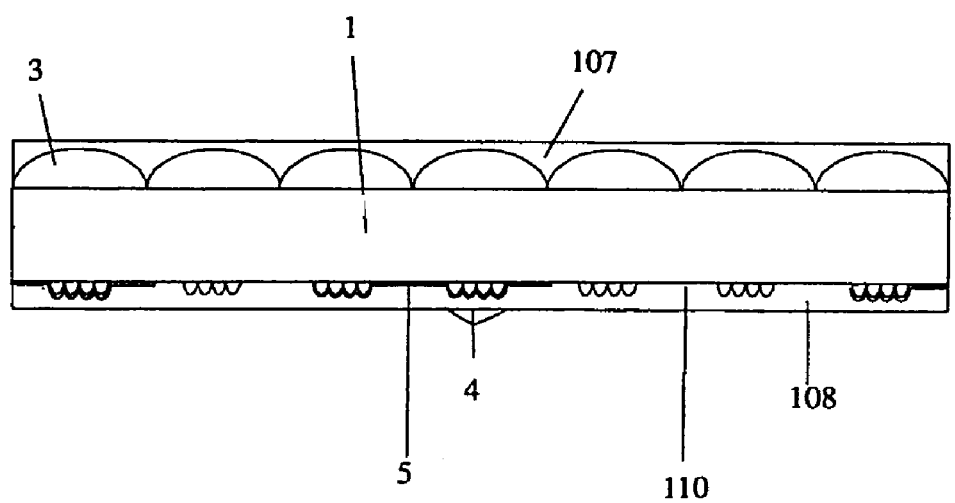
Figure 19:
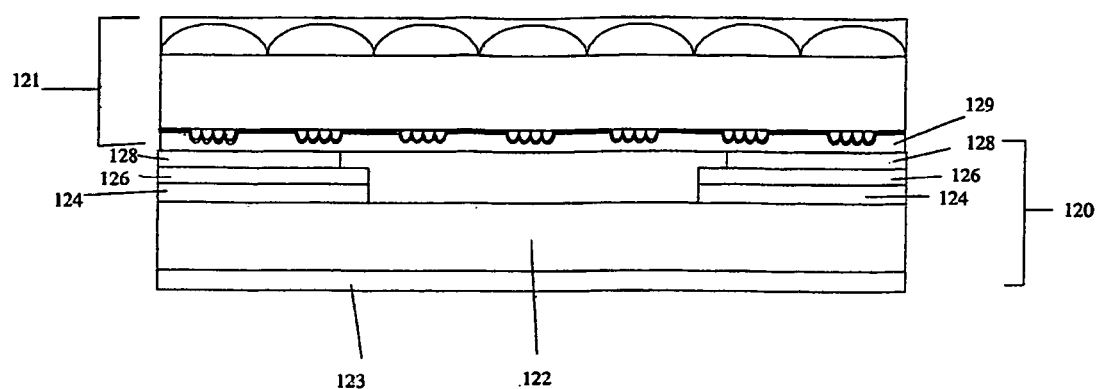
Figure 20:
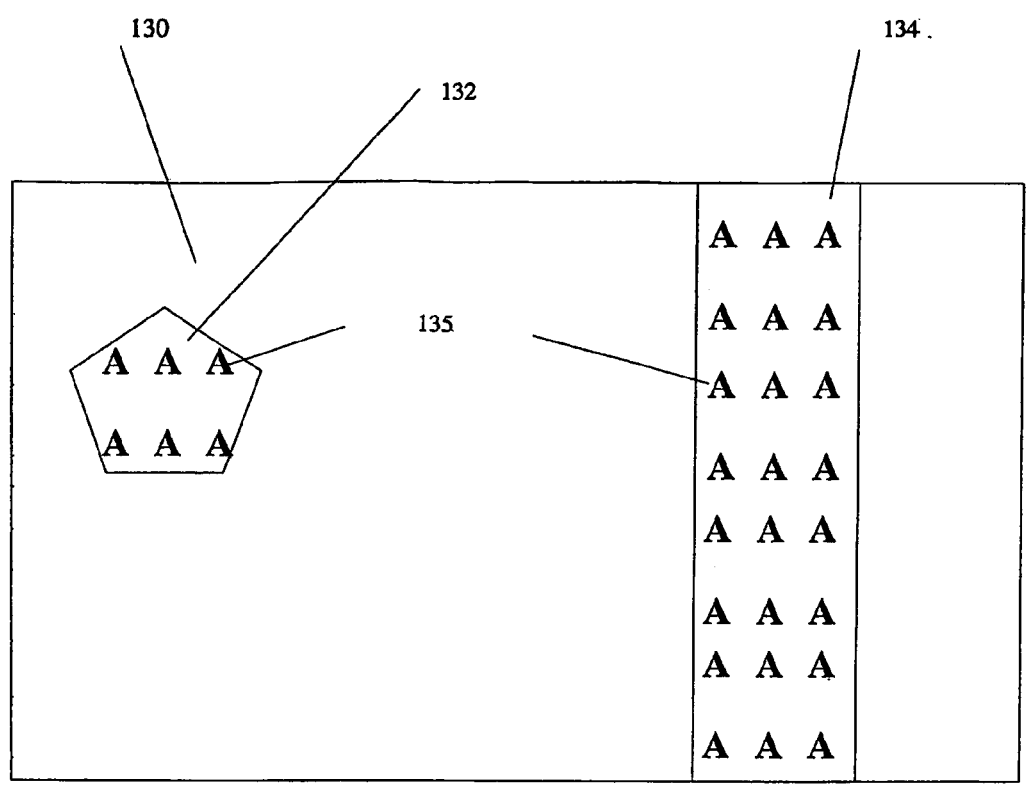
Figure 21:
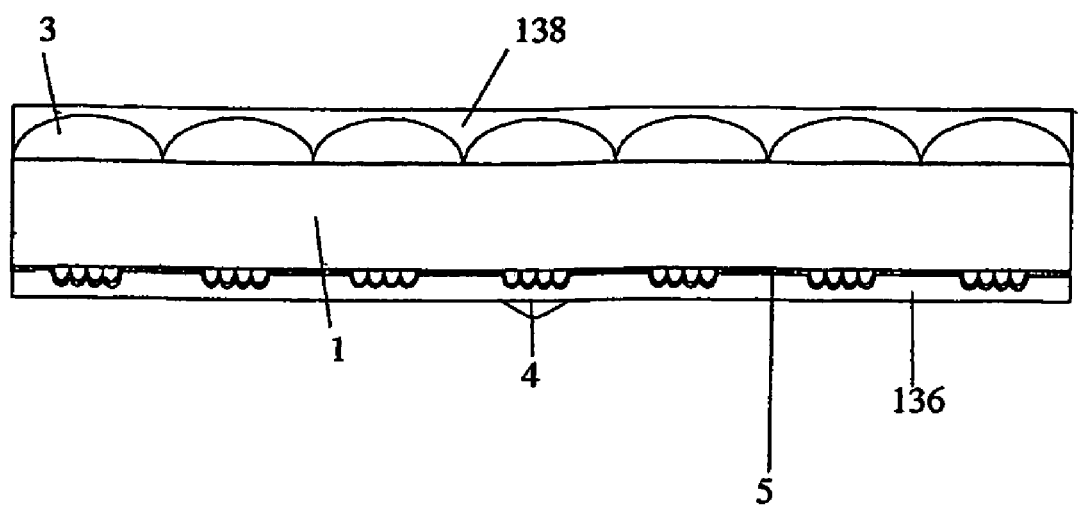
Figure 22:
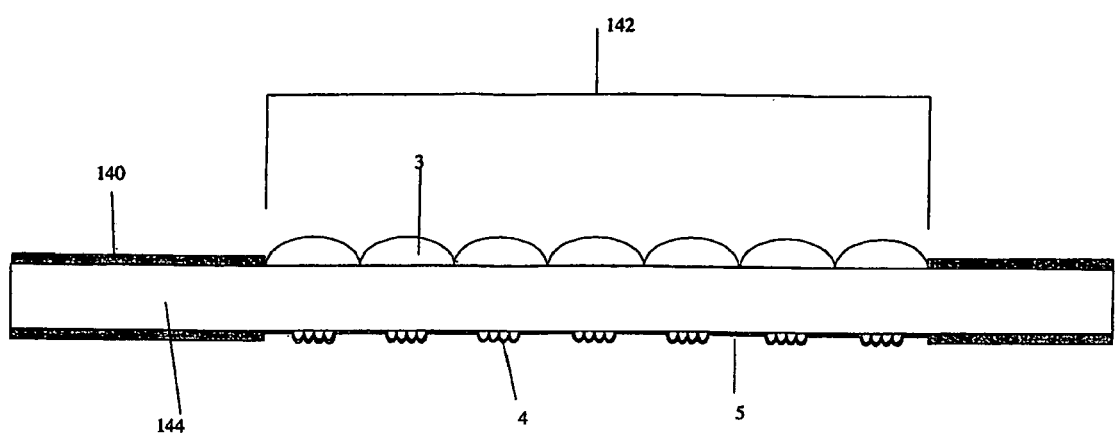
Figure 23:
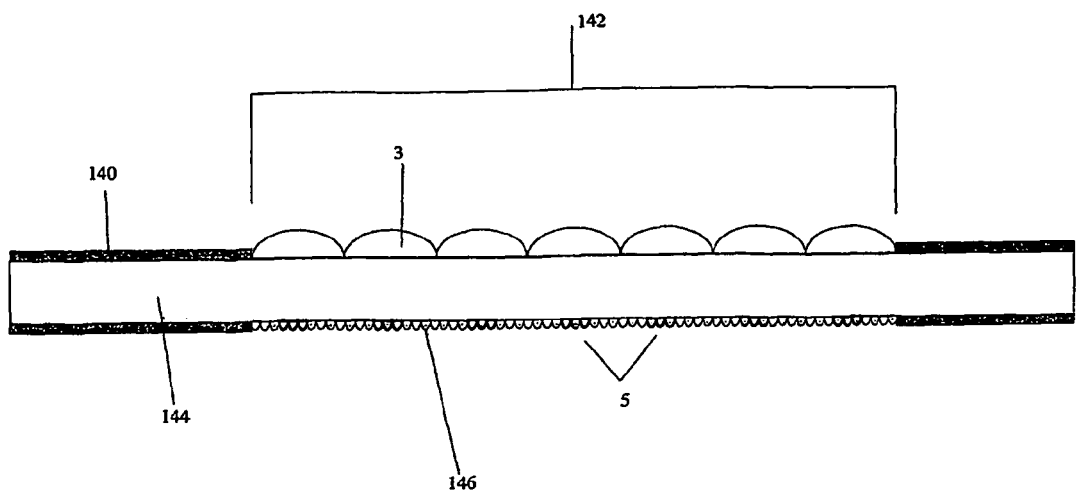
Figure 24A:
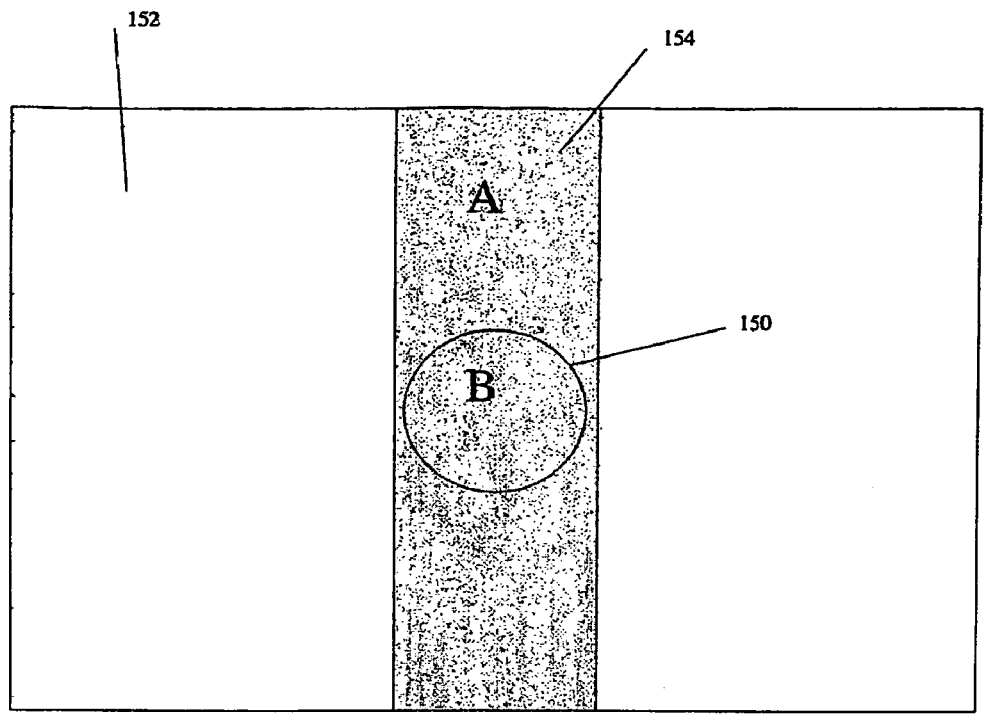
Figure 24B:
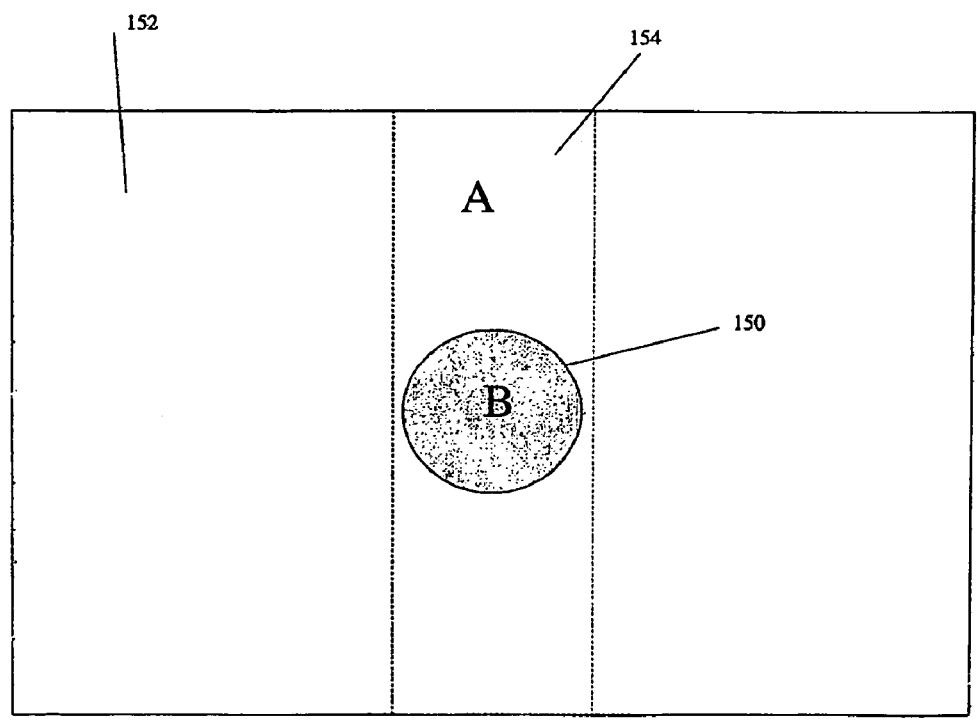
Figure 25:
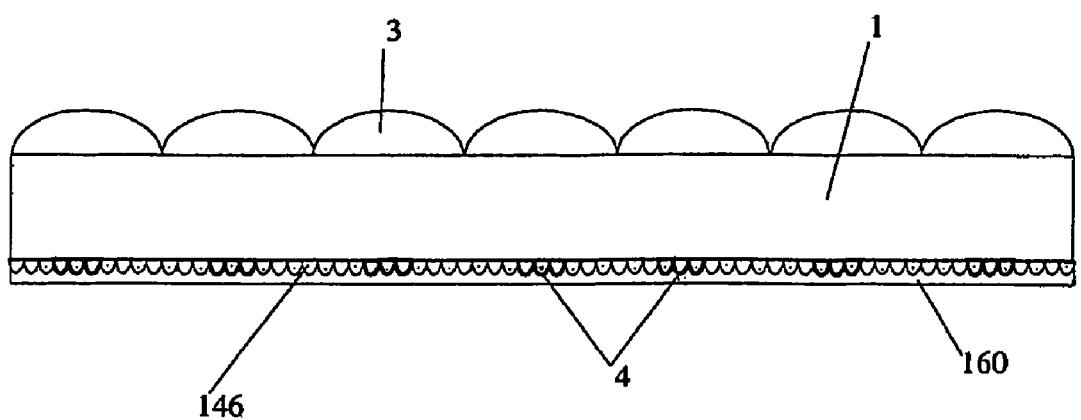
Figure 26:
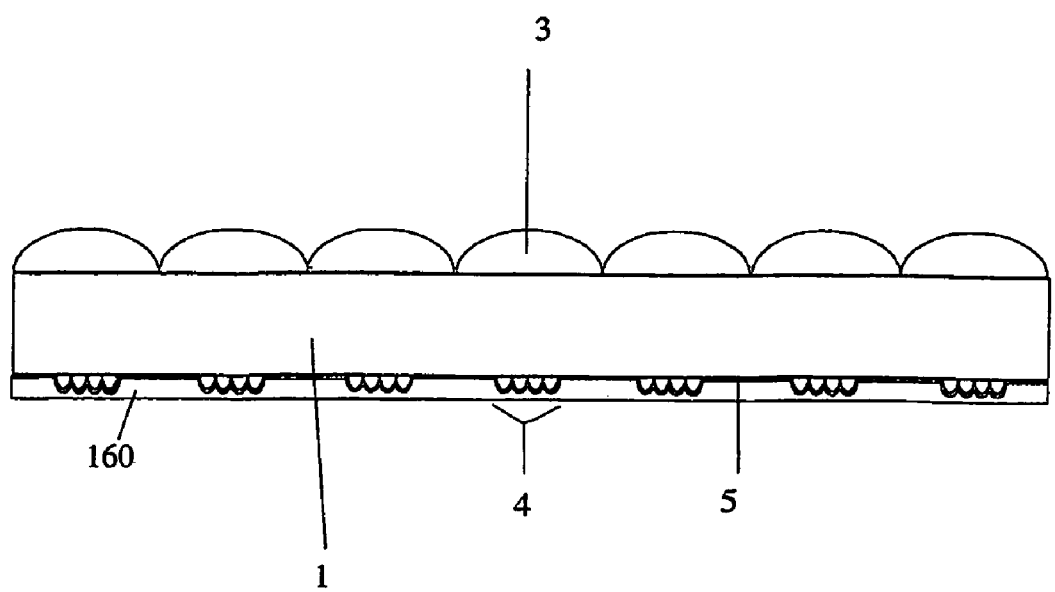
Figure 27:
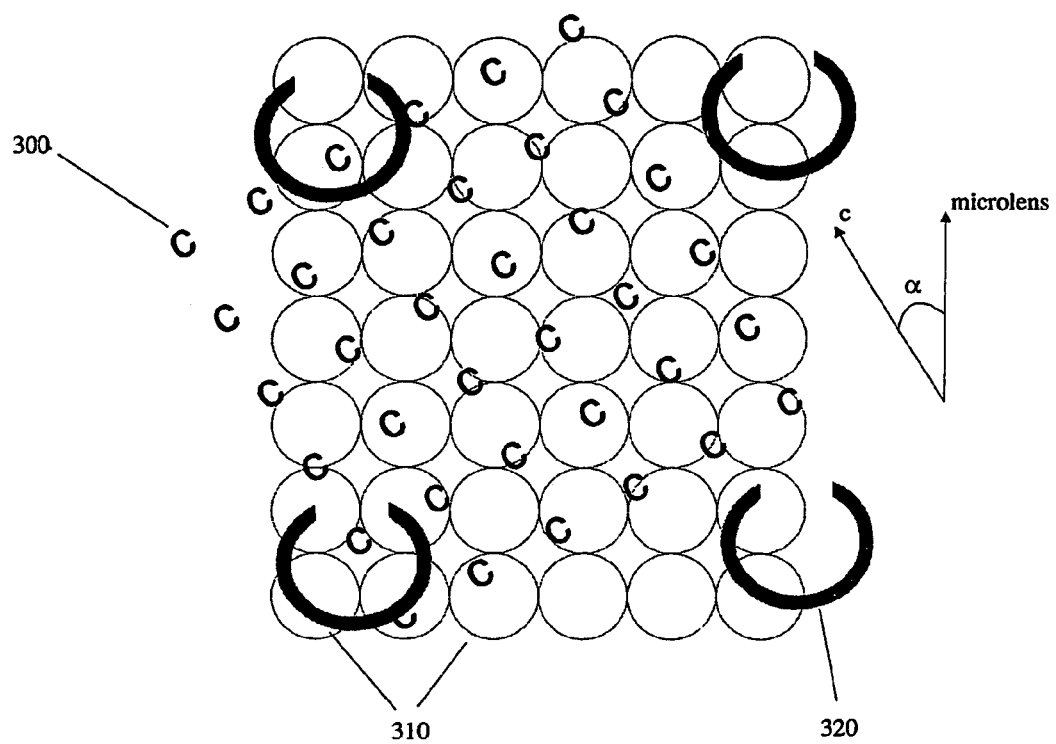
Figure 28:
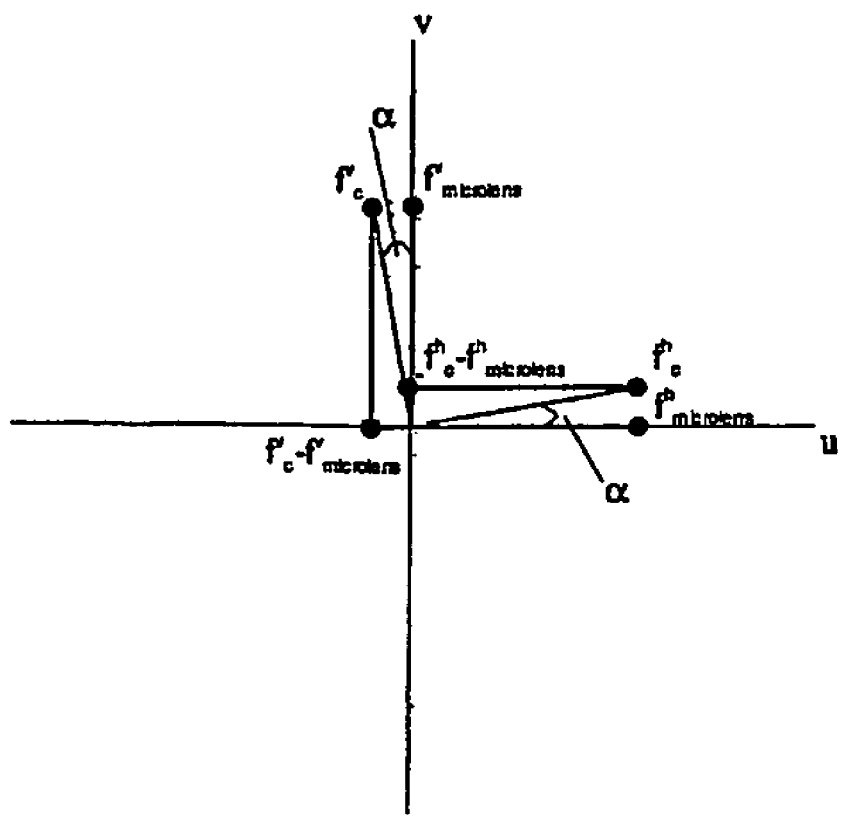
Figure 29:
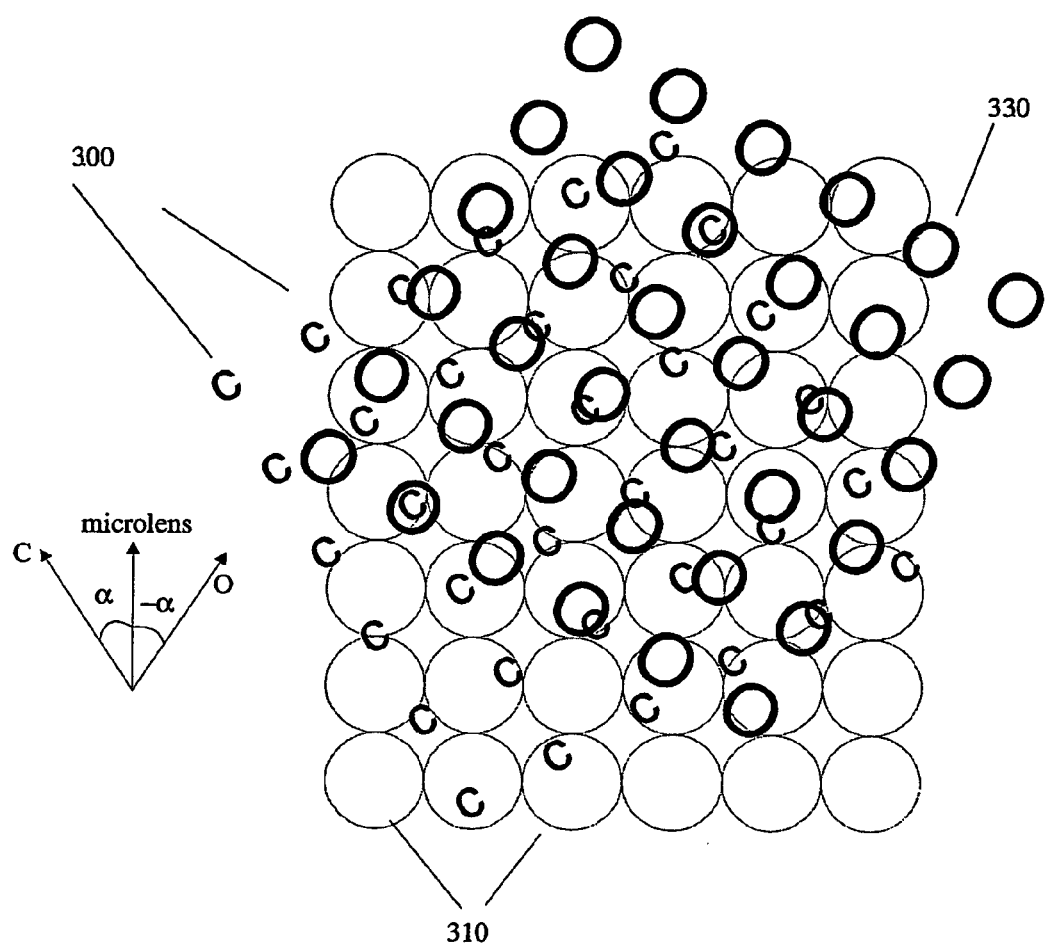
Figure 30:
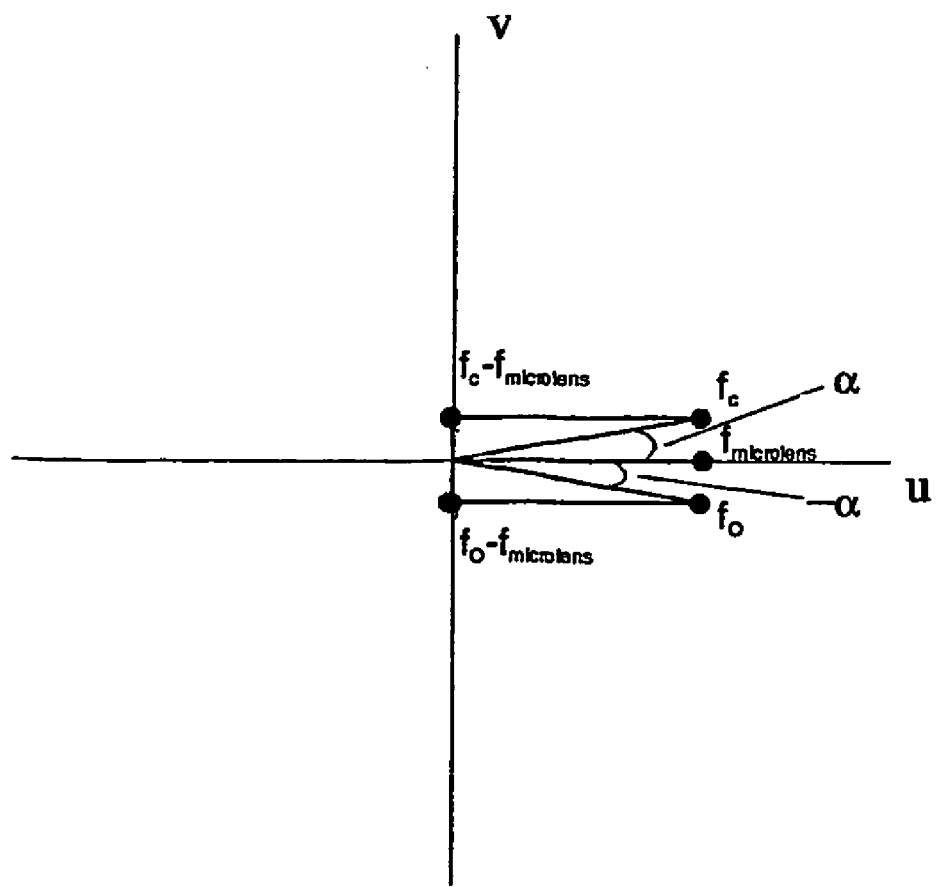
Figure 31:
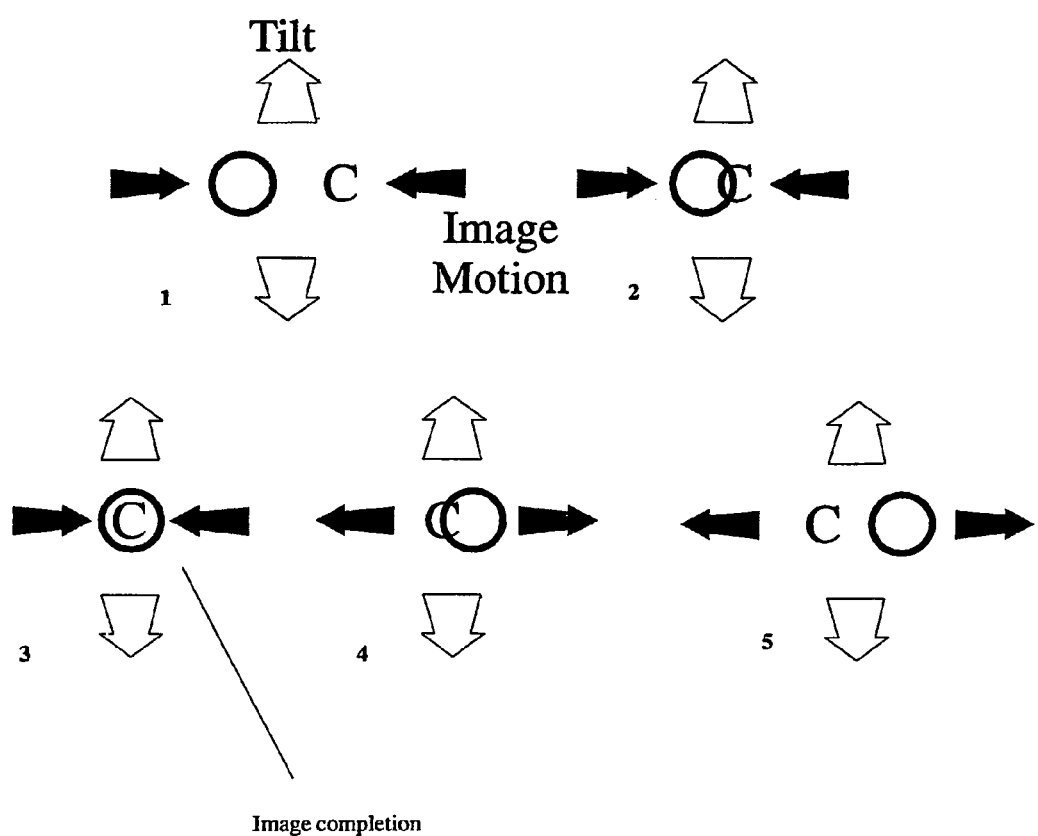
Figure 32:
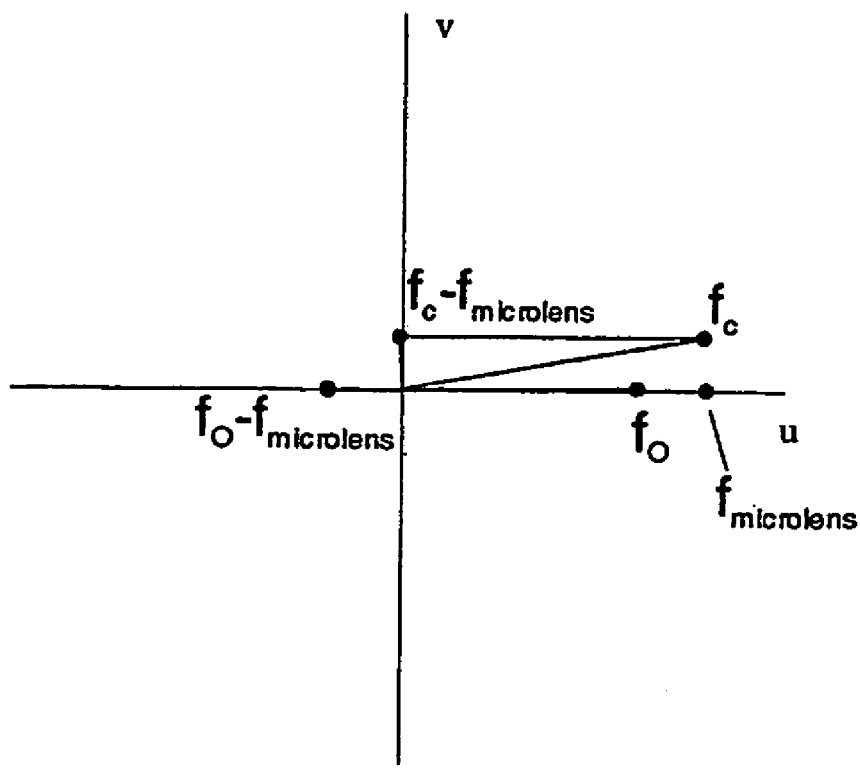
Figure 33:
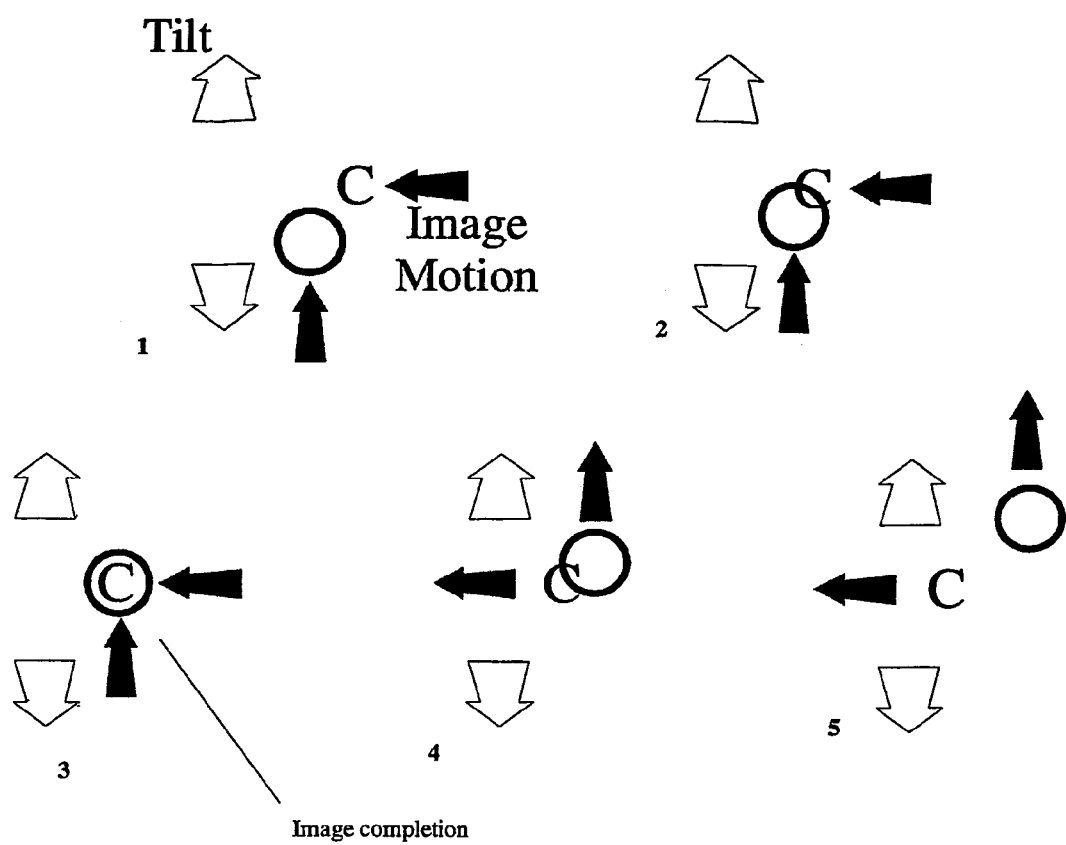
Figure 34:
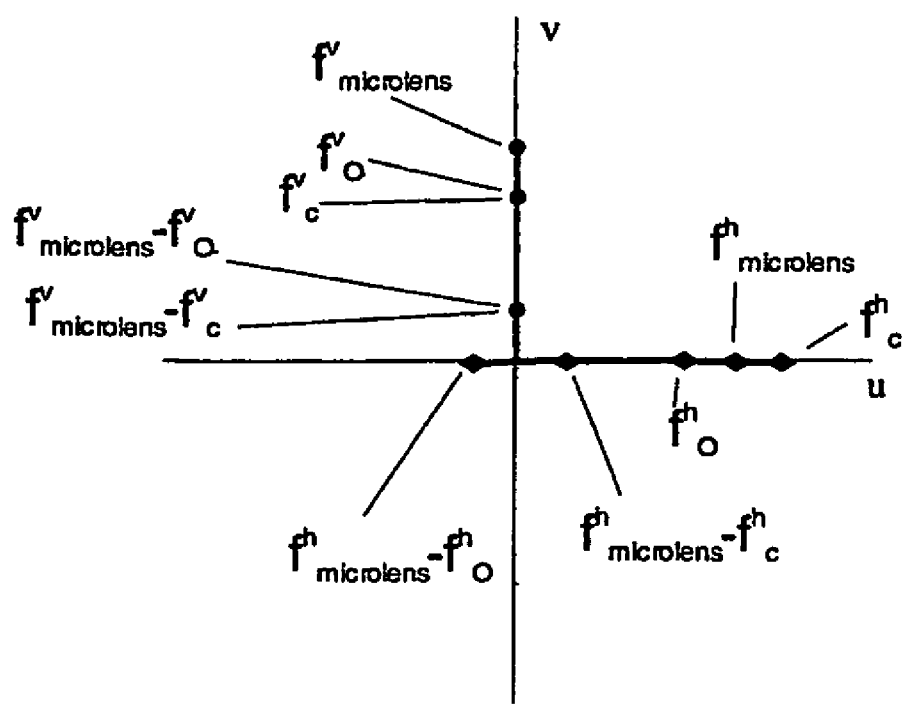
Figure 36:
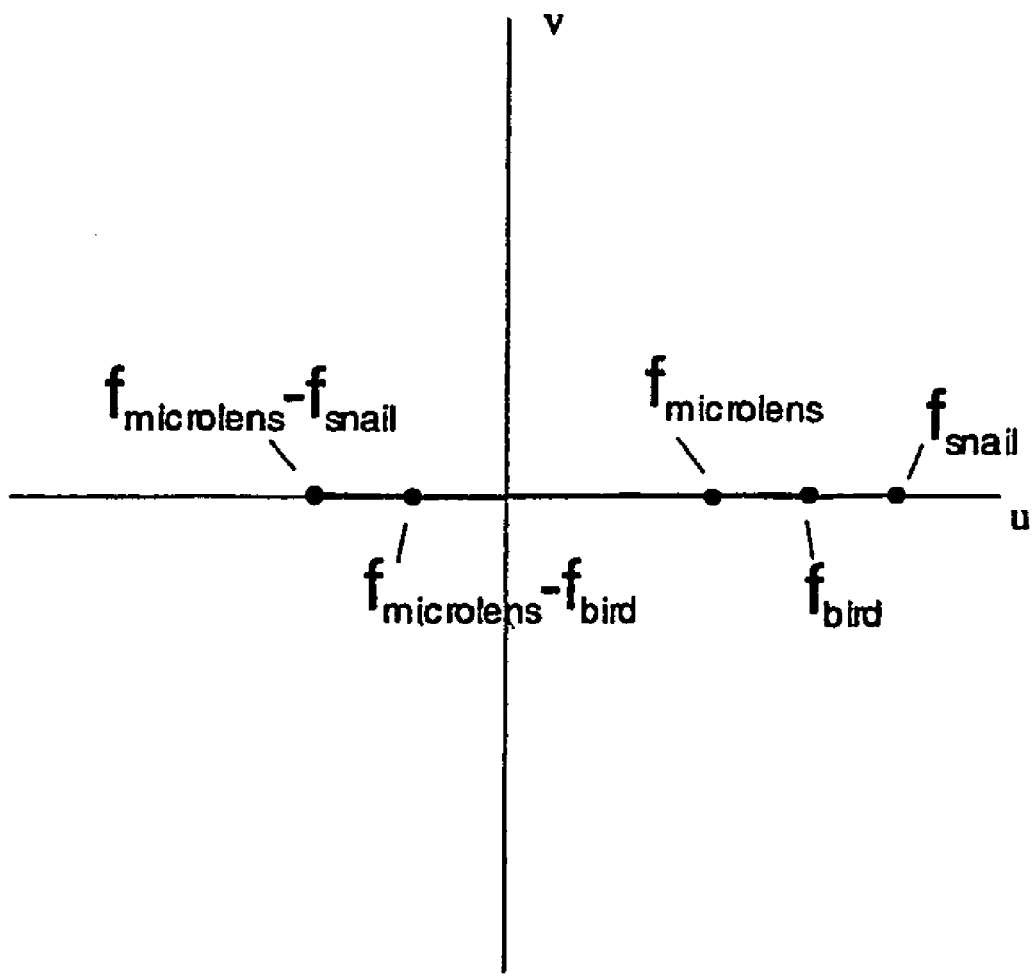
Figure 37:
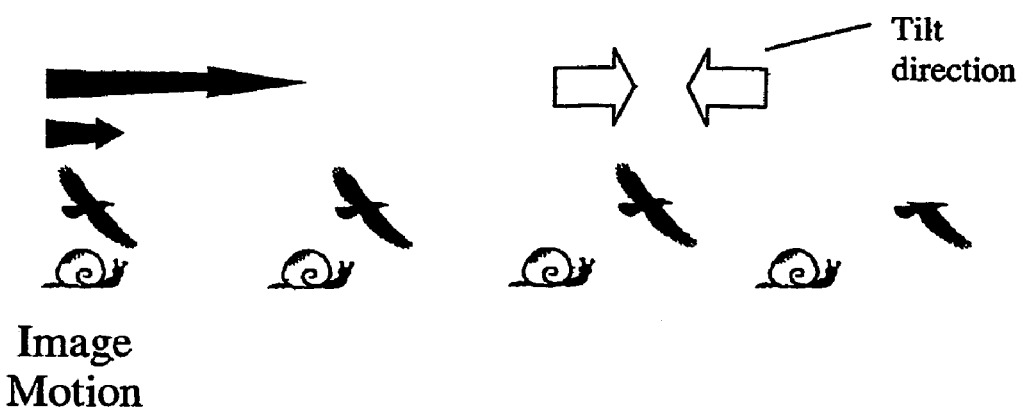
Figure 39:
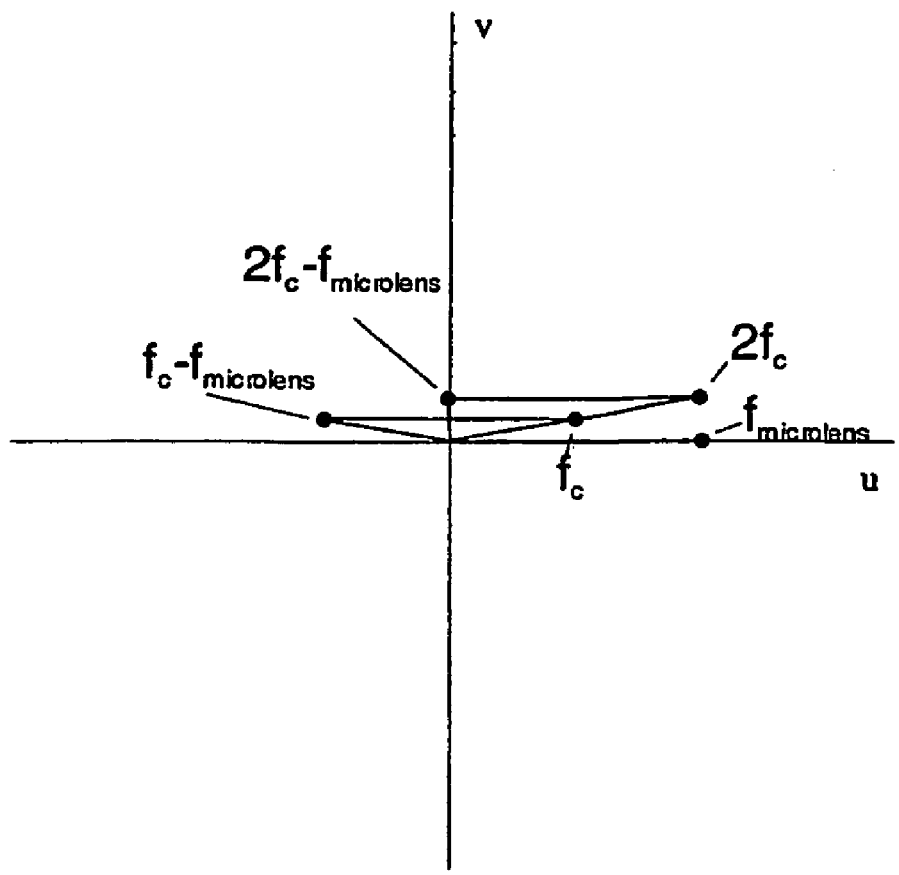
Figure 40A:
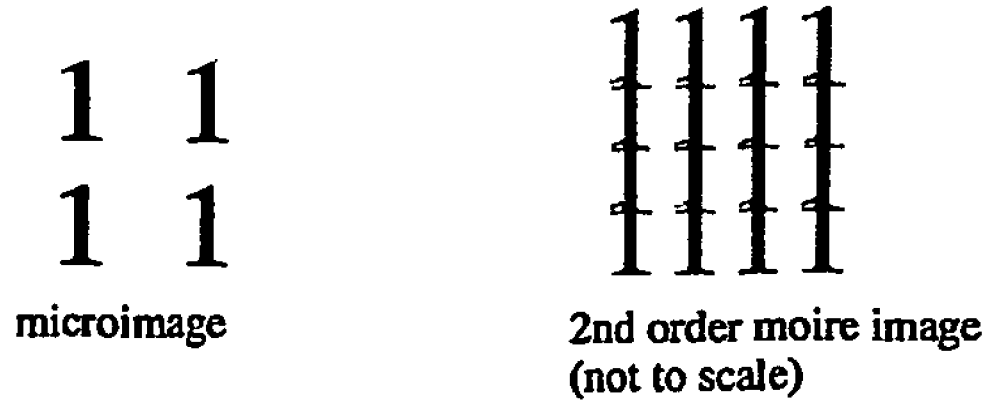
Figure 40B:
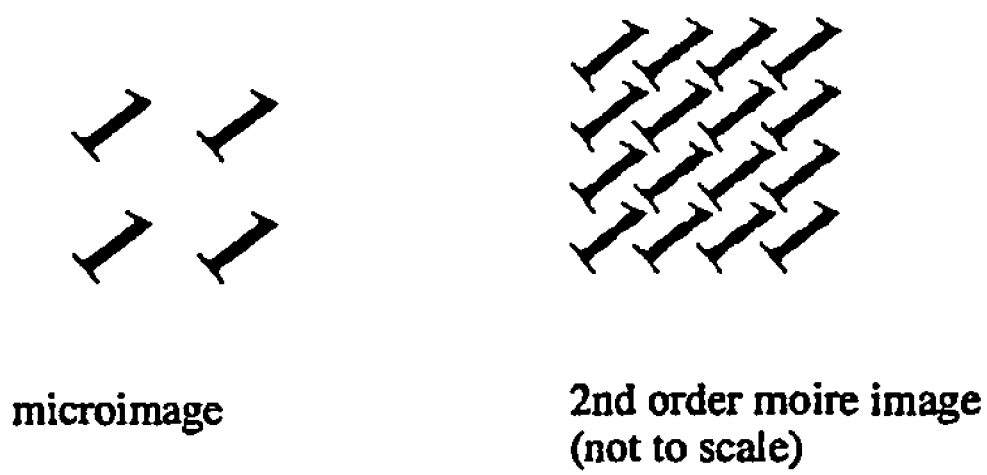
Figure 41:
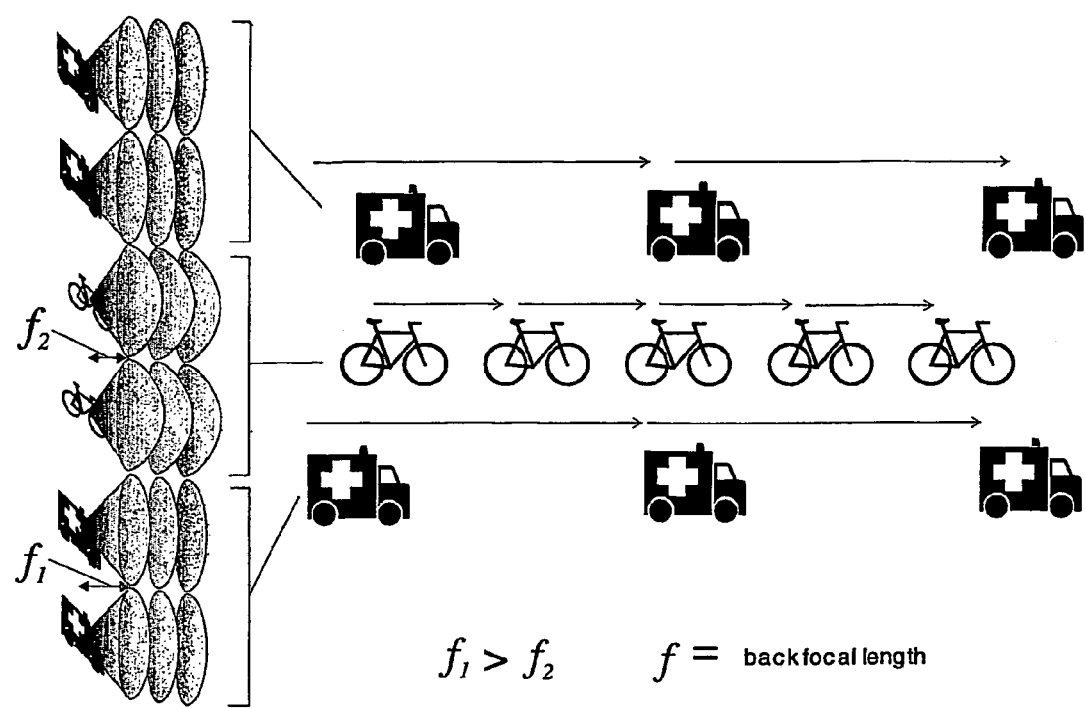
Figure 42:
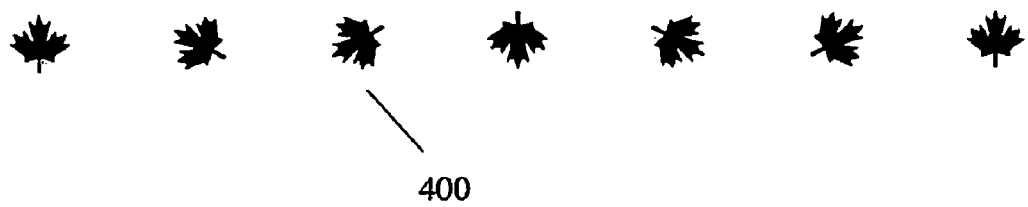

FIG. 6 defines the key parameters of a microlens;

FIG. 7 illustrates the cooperation between the microlens array and the microimage array of the FIG. 4 example;

FIGS. 8a and 8b are perspective views illustrating the first steps in the production of a master structure;

FIGS. 9a and 9b illustrate the steps involved in using the master structure to create microimages in a polymeric film;

FIGS. 10a-10c are perspective views illustrating the steps of metallising the structure shown in FIG. 9b;

FIGS. 11a and 11b are perspective views of an alternative embodiment;

FIG. 12 is a flow diagram illustrating the steps involved in a method according to the invention;

FIG. 13 is a schematic, cross-section through a second example of a device according to the invention;

FIG. 14 is a schematic, cross-section through a third example of a device according to the invention;

FIG. 15 is a schematic, cross-section through a fourth example of a device according to the invention;

FIGS. 16a and 16b illustrate schematically a fifth example of a device according to the invention;

FIG. 17 illustrates the incorporation of a security device according to the invention into a security thread;

FIGS. 18a and 18b illustrate two examples of security devices incorporated into security threads;

FIG. 19 illustrates in schematic, cross-section an example of a security device laminated to a machine readable structure;

FIG. 20 is a schematic, plan of an example of a security device forming a security patch or stripe;

FIG. 21 illustrates a security patch or stripe in cross-section;

FIG. 22 illustrates a security device provided in a transparent window of a polymer banknote;

FIG. 23 is a view of a modified version of the FIG. 22 example;

FIGS. 24a and 24b illustrate the incorporation of a security device into a paper banknote;

FIG. 25 is a schematic, cross-section through a further example of a security device;

FIG. 26 is a view similar to FIG. 4 but for inclusion in an aperture in a paper banknote;

FIG. 27 illustrates an example of a rotationally offset array of microimages;

FIG. 28 illustrates the relationship between the frequency vectors of the arrays shown in FIG. 27;

FIGS. 29 and 30 correspond to FIGS. 27 and 28 respectively but of a further example;

FIG. 31 illustrates the way in which magnified microimages intersect on tilting;

FIGS. 32 and 33 correspond to FIGS. 28 and 27 respectively but of a further example;

FIGS. 34 and 35 correspond to FIGS. 32 and 33 but of a further example;

FIGS. 36 and 37 correspond to FIGS. 34 and 35 but of yet another example;

FIG. 38 illustrates the appearance of a security device having microimage arrays forming a magnified E and magnified lines respectively;

FIG. 39 shows the frequency spectrum of a device in which the microimage array has a frequency half that of the microlens array;

FIGS. 40a and 40b illustrate the result of rotating the microimage array of FIG. 39;

FIG. 41 illustrates the appearance of yet a further example; and,

FIG. 42 illustrates the appearance of a microimage array in which the microimages are rotated slightly with respect to one another, when viewed through the microlenses.

Referring now to FIG. 4 there is illustrated a cross-section of a substrate typical of the construction of the present invention for use in security or authenticating devices. The construction comprises a substantially clear polymeric film 1 of polyethylene terephthalate (PET) or the like. On one surface 2 of the polymeric film is an array of microlenses 3. Microimages 4 in the form of anti-reflection structures are formed in the opposite surface. A thin metallic layer 5 is then applied to the surface containing the microimages in both the image and non-image areas. The clear polymeric film 1 acts as an optical spacer layer and its thickness is such that the microimages 4 are situated at the focal plane of the microlenses 3. In order to create the phenomena of moiré magnification and enable the generation of moving images a pitch mismatch is introduced between the microimage array and the microlens array. The preferred method of the current invention is to have a microlens and microimage array with substantially the same pitch where the pitch mismatch is achieved by introducing a small rotational misalignment between the microimage and microlens array. For the current invention the degree of rotational misalignment between the microimage and microlens array is preferably in the range 15°-0.05°, which results in a magnification range of between ~4×-1000× for the microimage array. More preferably the rotational misalignment is in the range 2°-0.1°, which results in a magnification range of between ~25×-500× for the microimage array.

Alternatively the microimage array and microlens array are in substantially perfect rotational alignment but with a small pitch mismatch. For the current invention a small pitch mismatch would equate to a percentage increase/decrease of the pitch of the microimage array relative to the microlens array in the range 25%-0.1%, which results in a magnification range of between ~4×-1000× for the microimage array. More preferably the percentage increase/decrease of the pitch of the microimage array relative to the microlens array is in the range 4%-0.2%, which results in a magnification range of between ~25×-500× for the microimage array.

It is also possible to use a combination of a small pitch mismatch and a small rotational misalignment to create the phenomena of moiré magnification and enable the generation of moving images.

To provide a complete description of the invention some of the various embodiments possible have been subdivided into five sections. The microlens array will be described in section 1, followed by a description of the ant-reflection image forming structures in section 2, the device construction in section 3, the incorporation of the device within a security document in section 4, and the improved optically variable characteristics of the security device in section 5.

1. Microlenses.

Figure 5:
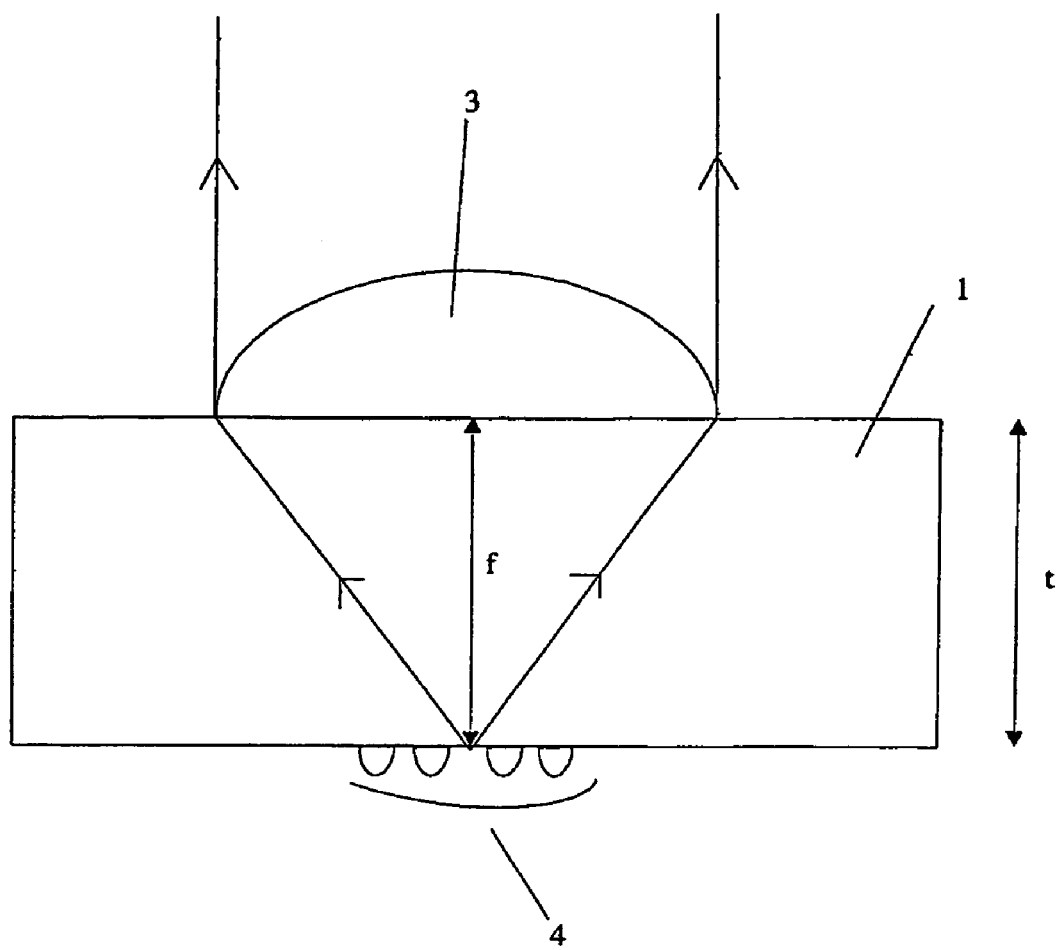
FIG. 5 illustrates the optical arrangement of a microlens and microimage.

The function of the microlens in the present invention is to image the light emitted from the microimage array, shown schematically in FIG. 5. FIG. 5 is a small section of the construction in FIG. 4, showing a single plano-convex microlens 3 on one surface of the clear polymeric film 1, and a single microimage 4 comprising an anti-reflection structure on the opposite surface. Referring to FIG. 5 in order for the device to function efficiently the thickness, t, of the clear polymeric film 1 is substantially equal to the back focal length, f, of the microlens 3 in the clear polymeric film.

The present invention is not limited to any specific type or geometry of microlens, the only requirement being that the microlens can be used to form an image. Microlenses suitable for the present invention include those that refract light at a suitably curved surface of a homogenous material such as plano-convex lenslets, double convex lenslets, and fresnel lenses. Preferably the present invention will comprise spherical microlenses but lenses of any symmetry including cylindrical lenses could be employed. Both spherical and aspherical surfaces are applicable to the present invention. It is not essential for the microlenses to have a curved surface. Gradient refractive index (GRIN) lenses image light by a gradual refraction throughout the bulk of the material as a result of small variations in refractive index. Microlenses, based on diffraction, such as Fresnel zone plates can also be used. GRIN lenses and amplitude or mask based fresnel zone plates enable the surface containing the microlens array to be planar and offers advantage in print receptivity and durability.

Although the microlens array could comprise discrete lenslets such as microspheres, rods, beads or cylinders, it is preferable to use a periodic array of lenses generated by a replication process. Master microlens arrays can be produced by number of techniques such as photothermal techniques, melt and reflow of photoresist and photoresist sculpture. Such techniques are known to those skilled in the art and are detailed in chapter 5 of "Micro-Optics: Elements, Systems, and Applications" edited by Hans Peter Herzig, published by Taylor and Francis, reprinted 1998. The master microlens structure can then be physically copied by commercially available replication techniques such as hot embossing, moulding or casting. Materials into which the microlens structures can be replicated include but are not limited to thermoplastic polymers such as polycarbonate and polymethylmethacrylate (PMMA) for the hot embossing and moulding processes and acrylated epoxy materials curable by heat or radiation for the casting process. In a preferred process the microlens array is replicated via casting into a UV curable coating applied to a carrier polymer film such as PET.

For simplicity the following examples and embodiments will describe the use of spherical microlenses.

The thickness of the present invention is dependent on the key characteristics of the microlenses, which are the focal length and the lens diameter, D. If we approximate the lens to a spherical (non-aspheric) thin lens then the focal length is effectively equivalent to the back focal length, f. The f-number, f/#, of a lens is defined as f/D. We can calculate the limit on the f/#:

The focal length of a thin piano-convex lens 6, as illustrated in FIG. 6, is given by $$1/f=(n-1)/R$$

where f is the focal length, n is the refractive index of the lens material and R is the radius of curvature of the lens.

$$\therefore (n-1)f=R$$

But the lens radius of curvature must be greater than half the lens diameter, D:

$$R \geq D/2$$

$$\therefore (n-1)f \geq D/2$$

$$\therefore f/D \geq 1/(2(n-1))$$

So for a lens with a refractive index of n=1.5 the f/# would be $\geq 1$ and for n=1.6 (a high refractive index for polymeric materials) the f/# would be $\geq 0.83$.

For a thin flexible security device, suitable for incorporation within a banknote, the thickness, t, of the clear polymeric film would need to be in the range 1-50 µm and more preferably in the range 10-30 µm. In order for the device to function efficiently the back focal length of the microlenses must substantially be in the same range. As a general guide, based on the calculation above and taking into account that the focussing length is made longer because the lens is focussing into a polymeric film, it could be said that the diameter, D, of the microlenses would fall in the range 1-50 µm and more preferably in the range 10-30 µm for application in a thin flexible security device. For a given lens diameter the back focal length could be decreased by decreasing the refractive index of the clear polymeric film or increasing the refractive index of the microlenses.

2. Anti-Reflection Structures—Microimage Layer.

The present invention utilises the combination of a microimage array with a microlens array to generate magnified images, which exhibit optically variable effects such as visually distinct movement and apparent depth. As discussed in the previous section the thickness of the device is dependent on the back focal length of the microlenses, which is in turn a function of the diameter of the individual lenses. In order to achieve thin flexible devices, suitable for authenticating banknotes, lens diameters within the range 1-50 µm would be appropriate.

In order for the device to function optimally the microimage array must have substantially the same pitch as the microlens array. Therefore a key challenge to producing a thin, flexible device is the generation of high-resolution high contrast images. The characteristics of the microimage layer of the present invention are key to producing such a thin device in a cost efficient and reproducible manner and differentiate the present invention from the prior art.

FIG. 7 illustrates the cooperation between the microlens array and the microimage array. In this example an array 7 of microimages of the object A is viewed through an array 8 of microlenses. A typical microimage array 7 will comprise many (e.g. 100 or more) microimage elements, repeating many times in each direction with a regular pitch. In this example the lens diameter, D, of the microlens array 7 and therefore the pitch, because there is no spacing between the lenses, is 30 µm. The fact that the microlens array 7 and the microimage array 8 must have substantially the same pitch dictates that the microimage must be created within a 30 µm×30 µm square area or less as it is preferable to leave a gap between the microimages. In a 30 µm×30 µm square area, a pixel size of 1 µm creates an image array containing 900 pixels that allows the formation of identifying images such as letters and numerals. If the pixel size is reduced further to 0.5 µm, more complicated identifying images could be generated from the 3600 pixel array.

As discussed previously it is not possible to create such high-resolution images using conventional printing techniques. It has been shown that high-resolution images of the type described herein can be written into photoresist using e-beam technology to create a master. The structure can then be replicated into a transparent polymer film using techniques such as hot embossing or UV casting. However the problem with this approach is that insufficient contrast is generated between the image and non-image areas. The advantage of the current invention is that it generates high-resolution images with high contrast.

The preferred embodiments of the current invention utilise the fact that periodic submicron anti-reflection structures appear black when metallised. It is therefore possible to write an image on the surface of a polymeric film in the form of a sub-micron anti-reflection structure. On metallising the film a high degree of contrast is generated between the image area, comprising the anti-reflection structure, which will appear black and the non-image areas, which will have a bright metallic appearance. An anti-reflection structure of the type utilised in the current invention, is any periodic structure that is finer than the wavelength of light and provides a surface layer in which the refractive index varies gradually from unity to the index of the bulk material, and thereby minimises reflections that are associated with sudden changes in refractive index.

Of course, a reverse effect can be achieved by using the anti-reflection structure to define negative images which are then filled with metal, the metal typically extending over the anti-reflection and anti-reflection free areas.

This disclosure will now concentrate on one particular type of sub-micron periodic anti-reflection structure known as the moth-eye structure, which is commercially available from a number of companies including Autotype International under the tradename MARAG™. These commercially produced films mimic the structure observed on the eye of some nocturnal moths that minimises the reflection of light allowing the moths to remain undetected by predators. Moth-eye films have a characteristic "egg box" periodic modulation typically with a repeating period in the range 200-400 nm and a structure height in the range 250-350 nm. For a given moth-eye structure with a period d and a height h, the reflectance is expected to be very low for wavelengths of light <~2.5 h and greater than d at normal incidence, and for wavelengths >2 d for oblique incidence, based on information in U.S. Pat. No. 6,570,710 filed in the name of Reflexite Corporation. If the visible part of the electromagnetic spectrum is considered in the range 400-700 nm then the reflectance would be very low in the visible region of the electromagnetic spectrum for a structure with a height of ~280 nm and a period of 200 nm. This structure would have an aspect ratio of 1:1.4, which is significantly lower and therefore easier to process than the light trap structures described in the prior art in U.S. Pat. No. 5,503,902.

The anti-reflection moth-eye structures can be produced on a photoresist-covered glass substrate by a holographic exposure using an ultraviolet laser. This process is disclosed in U.S. Pat. No. 4,013,465 filed in the name of Clapham and Hutley. The moth-eye structures can be made one-dimensional or two-dimensional, as discussed in patent U.S. Pat. No. 6,570,710. The two-dimensional moth-eye structures are used for the embodiments discussed in this disclosure but the invention could equally well be constructed using the one-dimensional structures. Once the master moth-eye anti-reflection structure is generated within the photoresist it can then be transferred to a nickel shim by an electroforming process.

The formation of a microimage array in the surface of a clear polymeric film for use in the current invention will be discussed with reference to FIGS. 8, 9, 10 and 11. The first step (FIG. 8*a*) is to produce a master structure 19 in a photopolymer layer 20 on a support 21 that comprises the moth-eye anti-reflection structure 23 in the form of a microimage array 22. Techniques for creating the moth-eye anti-reflection structure in the form of a microimage include holographic exposure, photolithography, laser writing and e-beam technologies. FIG. 8*b* illustrates one of the identifying microimages 25 showing the individual moth-eye anti-reflection structural elements 26. This master is now used to create a negative of the microimage structure in a nickel shim 27 using a standard electroforming process, illustrated in cross-section in FIG. 9*a*. The microimage structure in the Ni shim 27 is then copied on the surface of a polymeric film 28 using standard replication processes (FIG. 9*b*). Such processes include hot embossing, UV casting and moulding. The preferred replication processes for the current invention are hot embossing or UV casting as both allow continuous roll-to-roll production, which is important for mass production of the device in a cost efficient manner. FIG. 9*b* illustrates the UV casting replication process in which a thin layer of a UV curable polymer 29 is coated onto the clear polymeric film 28, which is then pressed against the Ni shim 27. The UV curable polymer is then cured before being separated from the Ni shim leaving the microimage structure replicated into the UV curable polymeric layer 29 on the surface of the clear polymeric film 28. One of the replicated microimages 30 is illustrated in FIG. 10*a*. In this condition there is insufficient contrast between the image and the film. Application of a thin metallic layer, such as Aluminium, 40 over the whole active surface of the device, including the moth-eye anti-reflection structure, produces a metallised film illustrated in FIG. 10*b*. In this condition the moth-eye anti-reflection structure in the form of identifying microimage 30 appears black in contrast to the non-structured areas of the film, which appear metallic. The identifying microimage effectively consists of black pixels that are ~0.25 µm in diameter correlating to an optimum resolution of ~10000 dpi. The thin metallic layer 40 is preferably produced using vacuum deposition. The final replicated microimage array is illustrated in FIG. 10*c* with black microimages against a bright metallic background. Alternatively the thin metallic layer can be applied only over the moth-eye anti-reflection structures. In this case, the device will consist of black microimages against a transparent background.

A pixel size of 0.25 µm means that a metallised moth-eye anti-reflection structure can be used to create a complex micro-image in a 30 µm×30 µm square area containing up to 14400 pixels (120×120 pixel array). This very high level of resolution enables the creation of a thin moiré magnifier suitable for application on flexible documents such as banknotes.

The microimage array illustrated in FIG. 10, with black microimages against a bright metallic background would when combined with an appropriate microlens array produce a device operating in reflection, as illustrated in FIG. 4. However it is also possible with the current invention to create a microimage array suitable for operation in transmissive mode. One method for obtaining a microimage array suitable for operation in transmission mode is illustrated in FIG. 11. The method is the same as that illustrated in FIGS. 8-10a except that the motheye ant-reflection structure 45 is no longer restricted to defined image areas and covers the whole of the UV curable polymeric layer 29, shown in FIG. 11a. The individual microimages 47 are then formed by selectively metallising the moth-eye anti-reflection structure, illustrated in FIG. 11b. In transmission the microimages would appear black on a clear transparent background. Conventional metallisation techniques such as vacuum deposition cannot achieve the very high resolution required for selective metallisation of microimages in the range 1-50 µm and therefore are not suitable for creating thin flexible devices. High-resolution selective metallisation can be achieved using techniques such as soft lithography as developed by IBM and detailed in the IBM Journal of Research and Development, volume 45, number 5, 2001.

The high contrast image structures described above do not have to be achieved by metallising the moth-eye anti-reflection structures, alternative methods may be used but reflecting properties are required. Referring to FIG. 10 if the image and non-image areas are overcoated with a transparent reflection-enhancing layer instead of a metallic layer then the anti-reflection moth-eye will negate the effect of the reflection-enhancing layer so incident light will be transmitted in that region. In the non-structured regions the film will be transparent but with a significant amount of reflection. Having regions of reflective and non-reflective film generates the image contrast. An example of a suitable refection enhancing material is zinc sulphide, which is a material that is partially reflective and partially transparent, which can be vacuum deposited to form a transparent thin layer. This provides an alternative construction, to that shown in FIG. 11b, for a device that can operate in a transmissive mode. In order to improve contrast in a reflective device, an additional absorptive layer can be used. The absorptive layer is preferably applied over both the non-structured areas and the moth-eye anti-reflection structures. Examples of the type of suitable absorptive materials include dyed or pigmented inks and coatings.

Using a reflection enhancing layer and an absorptive layer has a potential advantage over the metallic layer in that absorptive layer can be any colour. Preferably, the colour would be provided by a dyed or pigmented ink. The colour would not have to be the same all over the device; multiple colours are possible in different regions.

Colour generation is also possible with the embodiments comprising the metallised moth-eye anti-reflection structures. As discussed above the reflectance is very low for wavelengths below ~2.5× the height of the moth-eye anti-reflection structure and for wavelengths greater than the period of the moth-eye anti-reflection structure (at normal incidence). So by using a structure height too short to reflect all the visible spectrum (~200-250 nm say) wavelengths of >500-625 nm will be reflected giving a red appearance to the moth-eye anti-reflection structure. Similarly, by using a period too long for all wavelengths to be reflected (~500 nm say) the moth-eye anti-reflection structure will have a blue appearance (at normal incidence). The colour seen will change in intensity and hue with angle.

3. Device Construction

The microlenses and the high-resolution microimage arrays described in the sections above must now be combined to provide a thin optically variable device. The device must be constructed such that the back focal length of the lenses is substantially equal to the separation between the microlens and microimage arrays in order that the lenses image the microimages.

FIG. 4 illustrates a typical device construction of the current invention in which the device comprises a single layer, clear polymeric film. Preferred materials for the clear polymeric film include PET, polyamide, polycarbonate, poly(vinylchloride) (PVC), poly(vinylidenechloride)(PVdC), polymethylmethacrylate (PMMA), polyethylene naphthalate; polypropylene and the like. In this embodiment the microlens array is replicated to one surface of the film and the corresponding microimage array is replicated to the opposite surface.

A schematic of a method for producing a device of the current invention comprising a single layer film (FIG. 4) is shown in FIG. 12. In the method illustrated in FIG. 12 the microlens array and the microimage array are replicated into the polymeric film in different process steps in a continuous roll-to-roll process. Referring to FIG. 12 a roll of clear polymeric film of PET or the like is coated 50 on its first surface with a layer of UV curable polymer. Suitable UV curable polymers include photopolymer NOA61 available from Norland Products. Inc, New Jersey. The film is then brought into contact 52 with the first embossing roller that contains the negative of a master structure for the microlens array. On contacting the embossing roller the microlens array structure is replicated in the UV curable polymer layer. Once the structure is replicated the UV curable polymer layer is cured 54 by application of UV radiation and the coated film is then released form the embossing roller. A layer of UV curable polymer such as NOA61 is then coated 56 onto the opposite second surface of the film. The second surface of the film is then brought into contact 58A with the second embossing roller that contains the negative of a master structure for the anti-reflection moth-eye structure. On contacting the embossing roller the moth-eye anti-reflection structure is replicated in the UV curable polymer layer on the second surface of the clear polymeric film. Once the structure is replicated the UV curable polymer layer is cured 60A by application of UV radiation and the coated film is then released from the embossing roller. For a device operating in reflective mode the moth-eye anti-reflection structure takes the form of the microimage array (step 58A). A thin metallic layer is then applied (62A) to the second surface of the polymeric film. A suitable thin metallic layer would be Al applied by vacuum deposition. For a device operating in reflective mode the thin metallic layer is preferably applied uniformly (62A) over the whole active area of the second surface of the polymer film.

A transmissive device can be produced by replacing the thin metallic layer with a suitable reflection enhancing material, for example zinc sulphide, which can be applied to form a transparent thin layer. Alternatively a transmissive device can be generated by following process route B in FIG. 12. The process differs for the transmissive device from stage 58 onwards. For a device operating in transmissive mode the moth-eye anti-reflection structure is replicated uniformly over the whole active area of the second surface of the polymer film (58B). Once the structure is replicated the UV curable polymer layer is cured (60B) by application of UV radiation and the coated film is then released from the embossing roller. A thin metallic layer is then selectively applied (62B) to the moth-eye anti-reflection structures in order to form the identifying microimage array.

In an alternative process the microlens array structure and the microimage 20 array structure could be replicated onto opposite surfaces of the polymeric film simultaneously. Such a method would facilitate the control of the registration between the microlens and microimage arrays.

An alternative device construction of the current invention is one in which the device comprises a laminate film. FIG. 13 illustrates an example of a laminate construction for the current invention. In this embodiment the microlens array 3 is replicated in one surface of the first clear polymeric film 70 and the corresponding microimage array 4 is replicated in one surface of the second clear polymeric film 72. The non-structured surfaces of the clear polymeric films 70,72 and are then laminated together. A layer of suitable adhesive 74 may be required, for this process, applied between the non-structured surfaces of the clear polymeric films.

In order for the combination of the microlens array and the microimage array to generate a magnified image exhibiting optically variable effects such as visually distinct movement and apparent depth the registration of the microimage array to the microlens array must be controlled. The degree of register between the two arrays depends on the required optical properties of the security device. This is discussed in detail in EP 0698256 filed in the name of De La Rue International. In one embodiment the pitches of the microimage array and the microlens array are identical and the two are accurately aligned and the microimages are near the focal planes of the microimages. When this system is viewed from a given direction each microlens images the corresponding point on the image underneath it to form a single highly magnified image of the underlying microimage element. In a further embodiment a pitch mismatch between the microlens array and the microimage array is generated by angularly misaligning the arrays. The rotational misalignment between the two arrays results in the single magnified image splitting into a regular array of images with the number of visible images increasing and their individual sizes decreasing as the angular mismatch increases. In this embodiment much looser register/alignment constraints are required to form a viewable image, although it is still necessary to control the degree of registration such that the magnified image falls within defined tolerances.

A further device construction is one in which the microlens array comprises gradient refractive index lenses as illustrated in FIG. 14. Gradient refractive index (GRIN) lenses image light by a gradual refraction throughout the bulk of the material as a result of small variations in refractive index. GRIN lenses can be formed in a layer of photopolymer using a number of known techniques for example in U.S. Pat. No. 5,442,482 microlenses in the form of GRIN lenses may be formed by selective exposure of a photopolymer to a pattern of dots, such exposure being in ultra-violet light or suitable visible light and being effected by "contact" exposure through a mask having an array of circular holes formed therein, or by spot-by-spot exposure using a scanned ultra-violet laser, or by ultra-violet holography. The photopolymer can then be used to produce a nickel master enabling the structure to be replicated into a photopolymer layer applied to a carrier polymer film such as PET. GRIN lenses can be formed in polymer materials by diffusion polymerisation as detailed in chapter 5 of "Micro-Optics: Elements, Systems, and Applications" edited by Hans Peter Herzig.

The advantage of using GRIN lenses to form the microlens array of the current invention is that it enables the surface of the microlens array to be planar which facilitates overcoating or overprinting the device with further protective coatings or printed layers. The example device construction in FIG. 14 operates in reflective mode and comprises a GRIN microlens array 80 in the form of a photopolymer film that is adhered to the first surface of a clear polymeric film 82. A moth-eye anti-reflection structure is replicated in the second surface of the clear polymeric film to form an identifying microimage array 4. A thin metallic layer 5 is applied over the microimage array and the non-imaged sections of the second surface of the clear polymeric film. The device illustrated in FIG. 14 can be made to operate in transmission by replicating the moth-eye anti-reflection structure over the whole active area of the second surface of the clear polymeric film and then selectively metallising only the moth-eye anti-reflection structures which are used to form the identifying images.

A further device construction of the current invention is illustrated in FIG. 15 in which a holographic structure 86 is incorporated into the top surface of the microlenses 3. The zero order (non-diffracted) rays 88, are transmitted undeflected by the hologram and will be focussed onto the microimage 4 and will be used to form the magnified image of the microimages as described in the previous embodiments. The incoming rays that undergo first order diffraction from the holographic structure forms a holographic image 89. In order to enhance the holographic image a reflection enhancing layer may be applied to the holographic structure (such as described in U.S. Pat. No. 4,856,857). This construction combines the advantages of a traditional holographic optically variable device with the advantages of an optically variable device utilising non-holographic micro-optical structures. In a preferred embodiment, the device illustrated in FIG. 15, would be constructed such that for a certain set of viewing angles the magnified array of microimages would be visible while the brightness of the holographic image would be significantly reduced, but at a different viewing angles the increased brightness of the holographic image would make it clearly visible while the magnified array of microimage would have significantly reduced visibility. A switch between the magnified microimage and the holographic image is therefore observed on tilting the device.

A further device construction of the present invention is illustrated in FIGS. 16a and 16b in which an opaque mask 90 is deposited around the edges of the individual microlenses 3. Preferred materials for the masking 90 include a thin coating of Al applied using standard vacuum deposition techniques. The mask 90 could be created by selectively metallising each microlens 3 or metallising the whole surface of each microlens and then selectively demetallising to create an aperture 92 in the top of the lens. For the case of non-perfect registration between the microlens array 3 and the microimage array 4 (for e.g. created by a rotational misalignment), the array of magnified images will move on tilting and the shadowing effect of the opaque mask will cause a variation in brightness with certain areas of the microimage array being illuminated and other areas being shaded depending on the lighting conditions. The observer will see a bright image 98 when viewed normally to the surface of the clear polymeric film 1 and a dark image 99 when viewed off-axis, such that the image appears to fade in and out of view on tilting as shown in FIG. 16b.

4. Post Processing—Incorporation into Documents.

The various embodiments of the device construction described above can be slit or cut into patches, foils, stripes, strips or threads for incorporation into plastic or paper substrates in accordance with known methods.

In one embodiment the current invention could be incorporated into a security paper as a windowed thread. This is illustrated in FIG. 17 showing a security thread 100 formed by a device according to the invention with windows of exposed thread 102 and areas of embedded thread 104 in a document 105. EP 860298 and WO 03095188 describe different approaches for the embedding of wider threads into a paper substrate. Wide threads are particularly useful as the additional exposed area allows for better use of optically variable devices such as the current invention.

FIG. 18a illustrates an example cross-section of a security thread suitable for use as a windowed thread in paper, in which the device construction illustrated in FIG. 4 has been modified by the application of a layer of transparent colourless adhesive 107 to the outer surface containing the microlens array and the application of a layer of adhesive 108 to the outer surface containing the microimage array. Careful selection of the optical properties of the adhesive in contact with the microlenses is important. The adhesive must have a lower refractive index than the microlens material and the greater the difference in the refractive index between the microlenses and the adhesive the shorter the back focal length of the lenses and therefore the thinner the final security device.

The use of demetallised indicia in security threads is well known and is described in EP 0319157. In one embodiment of the present invention the highly advantageous characteristics of demetallised indicia are combined with the optical variable effects created by the combination of the microlens and microimage arrays. Referring to FIG. 18b the thin metallic layer 5 is demetallised such that metal free regions 110 are formed which overlap the image and non-image areas.

In the example above demetallisation destroys the contrast between the image and non-image areas. However a further advantage of the moth-eye anti-reflection structure is that it has a reduced wettability created by a combination of structure and surface energy. An applied liquid will not wet out the surface and will tend to roll off the surface due to insufficient surface tension to hold it in place. This property can be used to create preferential removal of Al by contact with a caustic solution of NaOH in water. The caustic solution will wet the non-image plain metal areas but will not wet the metallised moth-eye anti-reflection structure, which forms the identifying image. Under these conditions, the plain areas would then become transparent after demetallisation whilst the moth-eye areas would remain black.

It will be further understood by those skilled in the art that the proposed construction could be used in combination with existing approaches for the manufacture of security threads. Examples of suitable constructions that can be used include, but are not limited to, those cited within EP 0516790, WO 9825236, and WO 9928852.

FIG. 19 shows a machine readable construction 120 laminated to the basic construction 121 illustrated in FIG. 18a. The machine-readable construction comprises a polymeric film 122, such as a metallised 12 μm PET base coated with an adhesive 123 on the non-metallised side, which has been selectively demetallised. In this example two "tramlines" of metal 124 have been left along each edge of the construction but other variants are possible as illustrated within the cited prior art The "tramlines" 124 are such that when the final construction is laminated to substrate they are coincident with only metallised regions. A protective layer 126 may be applied onto the "tramlines" to prevent the metal being corroded by the magnetic layer 128, which is applied next. The magnetic material is only applied over the tramlines 124 so as not to obscure the indicia formed with the substrate. A suitable protective layer 126 is VHL31534 supplied by Sun Chemical applied with coat weight of 2 gsm. A suitable magnetic material is FX 1021 supplied by Ferron applied with a coat weight of 2-6 gsm. On to this a suitable laminating adhesive 129 is applied. The whole construction is then laminated to the basic structure illustrated in FIG. 18a to form the final machine-readable device.

In a further embodiment the current invention could be incorporated into a security document 130 as a security patch 132 or stripe 134. This is illustrated in FIG. 20 showing a security patch 132 and a security stripe 134 exhibiting a magnified image 135 resulting from the construction of the present invention.

FIG. 21 illustrates an example cross-section of a security patch or foil, in which the device construction illustrated in FIG. 4 has been modified by the application of a heat or pressure sensitive adhesive 136 to the outer surface containing the microimage array. In addition an optional protective coating/varnish 138 has been applied to the outer surface containing the microlens array 3. The function of the protective coating/varnish 138 is to increase the durability of the foil/stripe both during transfer onto the security substrate and in circulation. The protective coating must have a significantly lower refractive index than the refractive index of the microlenses for the same reasons that were discussed for the security thread adhesive. The device illustrated in FIG. 21 can be transferred to a security document 130 by a number of known methods including hot stamping and the method described in U.S. Pat. No. 5,248,544.

Once incorporated into a security document 130 the outer adhesive coating on the security thread and the protective coating on the patch/stripe can be overprinted using standard banknote printing techniques such as lithography and intaglio. The use of coloured transparent inks enables the magnified microimages to be of a defined colour.

The device of the current invention can be integrated into documents where the substrate is a transparent polymeric film. An example of this type of document would be polymer banknotes, particularly those described in WO 8300659, in which a transparent substrate is coated on both sides with layers of an opacifying material. The opaque layer 140 is applied in such a way as to leave a transparent region 142 for inspection of a security device. Referring to FIG. 22, microimages 4 in the form of moth-eye anti-reflection structures are replicated onto one surface of the transparent region 142 of the polymer banknote substrate 144 and the corresponding microlens array 3 could be replicated onto the opposite surface. A thin metallic layer 5 is then applied over the image and non-image regions of the surface of the transparent region 142 containing the microimage array 4. The transparent polymer substrate is used as the optical spacer to allow the image recorded in the microimage array to be recognisable through the microlens array. On viewing the device, from the top of the document, the magnified microimages will appear black on a metallic background.

In an alternative embodiment, the reflective device in FIG. 22, can be replaced with a device that operates in transmission. This can be achieved by replacing the thin metallic layer 5 with a suitable reflection enhancing material, for example zinc sulphide, which can be applied to form a transparent thin layer. On viewing the device, from the top of the document, the magnified microimages will appear non-reflective against a highly reflective glossy background.

Alternatively, referring to FIG. 23, a transmissive device can be generated by replicating the moth-eye anti-reflection structures 146 uniformly over the transparent region 142. A thin metallic layer 5 is then selectively applied to the anti-reflection structures in order to form the identifying microimage array. On viewing the device, from the top of the document, the magnified microimages will appear black against a transparent background. A further aspect of the device of the current invention operating in transmission is that the magnified array is only clearly discernible when viewed from the side of the document with the microlens array.

A further application of a transmissive device would be in the transparent aperture 150 of a paper banknote 152 such as those described in EP 1141480. This process enables a wide strip of an impermeable substrate to be included in a paper substrate. FIG. 24 illustrates an example of such a paper substrate 152 into which an impermeable strip 154 is incorporated to create an aperture 150. In the aperture 150 both surfaces of the impermeable substrate are visible, however the remainder of the strip is only visible from one side of the document as shown in FIG. 24a and not from the reverse side where the impermeable strip is covered by paper fibres as shown in FIG. 24b.

FIG. 25 shows a cross-section of one embodiment of the current invention that could be incorporated into a banknote as an aperture in the form of impermeable strip in FIG. 24. The device construction is as illustrated in FIG. 4 except that the anti-reflection moth-eye structure is no longer restricted to defined image areas and covers the whole of surface of the clear polymeric film 1. The individual microimages are then formed by selectively metallising 5 the moth-eye anti-reflection structures 146. In addition an adhesive 160 is applied to the outer surface containing the microimage array. Referring to FIG. 24 if the optically variable device covers the whole surface of the impermeable strip, and is inserted such that the microlens array is on the upper surface as viewed in FIG. 24a, then from the side of the document shown in FIG. 24a the magnified image will be viewable in reflection in area (A) and transmission and reflection in area (B). From the reverse side of the document (FIG. 24b) it will only be visible in area B and not very clearly discernible because the microimages are not being viewed directly through the microlens array.

In a further embodiment a reflective device can be included as an aperture in a paper banknote. A typical device construction is shown in FIG. 26. The device construction is as illustrated in FIG. 4 with an additional adhesive layer 160 applied to the outer surface containing the microimage array. Referring to FIG. 24 if the reflective device covers the whole surface of the impermeable strip, and is inserted such that the microlens array is on the upper surface as viewed in FIG. 24b, then from the side of the document shown in FIG. 24b the magnified image array will be viewable in reflection in area B comprising of black images against a metallic background. From the reverse side of the document (FIG. 24a) the strip will simply have a uniform metallic appearance as the microimages are not being viewed directly through the microlens array and are too small to be discernible directly with the naked eye.

The device in FIG. 26 can be made to operate in transmissive mode by replacing the thin metallic layer with a suitable reflection enhancing material, for example zinc sulphide, which can be applied to form a transparent thin layer. On viewing the device from the side of the document shown in FIG. 24b the magnified microimages will appear non-reflective against a highly reflective glossy background. From the reverse side of the document (FIG. 24a) the strip will have the appearance of a uniform glossy transparent film as the microimages are not being viewed directly through the microlens array and are too small to be discernible directly with the naked eye.

5. Improved Optically Variable Characteristics of the Security Device

A third aspect of the current invention is to provide an optically variable device with improved anti-counterfeit properties over the prior art devices. This will be achieved by viewing two or more microimage arrays through a corresponding array of spherical or near spherical microlenses, where the resultant magnified images move on tilting the device to form one completed image. The completion of an image on tilting provides a well-defined security feature, which is easier for the general public to remember and identify than the known simple image movement devices.

The preferred construction of the improved optically variable device of the current invention is the one described in the first aspect of the current invention, which combines a microlens and microimage array, on two opposing surfaces of a polymeric film, to form an optically variable device in which a thin structure is achieved by using an anti-reflection structure to create high resolution images. However other constructions that use different methods for creating the microimages but still enable an interaction between an analysing array of microlenses and a corresponding set of identical microimages can be used to generate the improved optically variable effects of the current invention. One alternative method to create the microimages includes conventional printing techniques such as gravure, lithographic or intaglio printing. Another method of producing a microimage array is to selectively remove areas from a metallised plastic film, for e.g. an aluminised film, to form images. This could be achieved by printing on an etchant solution to remove selected areas of metal, or printing a protective layer on the metal then removing unprotected areas using an etch solution. An alternative method to create the microimages is to use light-trapping tapered structures described in U.S. Pat. No. 5,503,902.

The various interactions between the microlens and microimage arrays and the resultant optically variable effects of the current invention will now be described in detail.

First consider a simple example where the security device comprises one microimage array ("c") combined with one microlens array. FIG. 27 illustrates the rotational relationship between the "c" image array 300, the microlens array 310 and the resultant magnified (moiré) "c" image array 320 and FIG. 28 shows the corresponding frequency spectrum. In FIG. 28 the microlens array is represented by the two frequency vectors $f^h_{microlens}$ and $f^v_{microlens}$ (horizontal and vertical direction), and the "c" microimage array is represented by the two frequency vectors $f^h_c$ and $f^v_c$ (horizontal and vertical direction). The "c" microimage array 300 is rotated by an angle α relative to the microlens array 310 as indicated on FIGS. 27 and 28. In this arrangement the frequency vectors of the magnified (moiré) "c" image array 320, represented by $f^h_c - f^h_{microlens}$ and $f^v_c - f^v_{microlens}$, are arranged such that they are at ~90° to the respective horizontal and vertical frequency vectors of the microlens. In this condition tilting the combined microlens/microimage array vertically around the horizontal axis results in a counter intuitive ortho-parallactic horizontal motion in the magnified image. In FIG. 28 both the vertical and horizontal frequency vectors have been included but in this embodiment, and subsequent embodiments unless stated, the frequency of the microimage and microlens arrays are the same in the two orthogonal directions and therefore for simplicity only one of the frequency vectors is shown on the relevant frequency spectrum.

Image Completion

In a further embodiment an additional microimage array ("O") 330 (FIG. 29) is incorporated into the security device illustrated in FIGS. 27 and 28 such that the new security device comprises two microimage arrays ("c" and "O") combined with one microlens array. The microimages within each array 300,330 are identical with others in the same array but different from the microimages in the other array. The two microimage arrays are incorporated in the same plane but have a different rotational orientation within the plane. FIG. 29 and the corresponding frequency spectrum in FIG. 30 show the situation where the two microimage arrays 300,330, represented by the frequency vectors $f_o$ and $f_c$, are arranged such that they are at opposing rotational angles ($\alpha$ and $-\alpha$) to the microlens array represented by the frequency vector $f_{microlens}$. In this arrangement the magnified (moiré) image arrays, represented by $f_o-f_{microlens}$ and $f_o-f_{microlens}$ are orientated ~180° from each other and appear to travel in opposing directions when tilted. At specific tilt angles the images are superimposed creating a single complete image from two component images. An example of this is shown in FIG. 31 using the © symbol. The "c" moves (images 1-3) to the centre from the right and the "O" moves to the centre from the left. At specific tilt angles (image 3) the complete © symbol is created. Continuing the tilt (images 4-5) results in the images continuing to move but now apart. The optically variable effect produced increases the sensation of movement by firstly having image arrays moving in opposite direction such that the relative motion is doubled and secondly by having image arrays moving relative to reference points (i.e. the other image array) that are in the same field of view. The completion of a single image by the moving together of two component images on tilting provides a memorable and easily recognizable method of authentication above that provided by the simple movement of the images.

The embodiment above is not limited to the image arrays moving in opposite directions. Alternatively, the frequency vectors of the two magnified image arrays can be modified to allow relative motion in any required direction. For example the frequency spectrum in FIG. 32 is as that shown in FIG. 30 except that the microimage array, represented by the frequency vector $f_o$, has been rotated by ~90° so it is now at the same orientation as the microlens array, represented by the frequency vector $f_{microlens}$, and its frequency decreased such that $|f_o|<|f_{microlens}|$ (where $|f|$ represents the magnitude of the frequency vector and not the orientation). In this arrangement the magnified (moiré) image arrays, represented by $f_o-f_{microlens}$ and $f_o-f_{microlens}$ are orientated ~90° from each other and appear to travel in perpendicular directions when tilted. The result of this combination in respect to image motion on tilting is shown in FIG. 33 again using the © symbol. On tilting the device the "c" moves from right to left and the "O" moves from bottom to top. At specific tilt angles (image 3) the complete © symbol is created.

In a further example the security device comprises two microimage arrays ("c" and "O") combined with one microlens array. In FIG. 34 the microlens array is represented by the two frequency vectors $f^h_{microlens}$ and $f^v_{microlens}$ (horizontal and vertical direction) and the first microimage array is represented by the two frequency vectors $f^h_c$, $f^v_c$ (horizontal and vertical direction) and the second microimage array is represented by the two frequency vectors $f^h_o$ and $f^v_o$ (horizontal and vertical direction). Referring to FIG. 34 the magnitude of the frequency of the microlens array is the same in the two orthogonal directions ($|f^h_{microlens}|=|f^v_{microlens}|$) and related to the two microimage arrays as follows ($|f^v_c|=|f^v_o|)<|f^v_{microlens}|$ and $|f^h_o|<|f^h_{microlens}|<|f^h_c|$, such that "c" microimages have a longer pitch than the microlens array in the vertical direction and a shorter pitch in the horizontal direction whereas the "o" microimages always have a longer pitch than the microlens array. In this arrangement the resultant magnified (moiré) image arrays have the same frequency and orientation in the vertical direction, i.e. $f^v_{microlens}-f^v_o=f^v_{microlens}-f^v_c$, but in the horizontal direction they have the same frequency but are oriented at 180° to each other, i.e. $f^h_{microlens}-f^h_c=(f^h_{microlens}-f^h_o)$. The result of this combination in respect to image motion on tilting is shown in FIG. 35. A vertical tilt results in the two magnified image arrays moving at the same speed and in the same direction whilst a horizontal tilt results in the magnified image arrays moving in opposite directions and therefore the completion of the copyright symbol © is only possible when tilting in the horizontal direction. The device can be applied to a banknote such that when the banknote is tilted along its short direction image completion occurs but when tilted along its long direction image completion is not possible. The device is therefore straightforward for the member of the public to authenticate but very difficult to counterfeit due to the requirement to replicate the image completion and the distinct variability of image motion with bit direction.

Combine with Print Image

In an additional embodiment an optically variable effect is created by combining moving magnified images generated by the various security devices described above with a printed image on a security document. Such an embodiment would combine one or more floating image arrays with a print design. In a simple example a moving magnified image array links in with the printed image to more clearly associate the device with the document. In a more advanced version the moving magnified image would complete the printed image or locate within the printed image. For example on tilting the magnified image array will appear to move and at certain angles of view the magnified image will align with the static printed image to verify the document. For example the moving image "c" could complete a printed symbol "O" to give "©". Security is enhanced because the sensation of movement is increased by providing reference points in the field of view and because the following is required; a) exact control of the magnification of the microimage array in order to fit inside the printed image and b) registration between the security device generating the moving image and the printed image if the images are to link together at certain angles of view.

The printed image could comprise an array of images or one large image. For example a number of small moving magnified images could locate into one large static printed image. This again has the advantage of a high degree of complexity in registering the security device generating the moving image to the printed image. The moving images could simply link in with the printed image for example a moving array of crests floating above a larger printed crest.

In a more complex example two magnified image arrays moving relative to each other can be combined with a static printed image such that all three images link together at the same time forming one complete image thus increasing the registration complexity even further.

In the above examples the printed image could be printed over the various security devices of the current invention or under the device if it is sufficiently transparent for the printed image to be visualised.

Different Periods

In a further embodiment the security device comprises two microimage arrays combined with one microlens array. The microimage arrays have a different period. The microimages within each array are identical with others in the same array but different from the microimages in the other array. In the example in FIG. 36 there are two microimage arrays, one of a bird and one of a snail, represented by the frequency vectors $f_{bird}$ and $f_{snail}$, and a microlens array represented by the frequency vector $f_{microlens}$. The microimage array of the snail has a slightly smaller period length than the microimage array of the bird which in turn has a slightly smaller period than the microlens array such that $|f_{microlens}|<|f_{bird}|<|f_{snail}|$. In this arrangement the magnified (moiré) image array of the bird, represented by $|f_{microlens}-f_{bird}|$, has a lower frequency and therefore greater magnification that the magnified (moiré) array of the snail, represented by $|f_{microlens}-f_{snail}|$. On tilting the device the magnified image array of the bird appears to move at greater speed than the magnified image array of the snail such that the individual images become further apart on tilting as illustrated in FIG. 37. The motion of the two magnified image arrays can be arranged to be in the same direction, opposing directions or any other relative direction by modifying the frequency vectors.

Supermoiré

In a further embodiment the security device comprises two microimage arrays combined with one microlens array such that the microimages are made up from lines arranged such that the magnified image itself also shows a moiré effect. An example is illustrated in FIG. 38 where a magnified image forming an "E" (left) is combined with a simple magnified image of lines. On tilting, the magnified images move relative to each other and the E is hidden when the line patterns are in phase, and is revealed when the line patterns are out of phase. The images can be combined such that recognisable designs appear with the moving lines giving a combined moving image.

Alternatively, both images could consist of all-over line patterns, slightly misaligned, such that tilting of the feature gives the effect of travelling waves across the surface of the feature.

Higher Order Moiré

Although it is preferred it is not essential that the microlens array has a frequency close to that of the microimage array for the phenomenon of moiré magnification to occur. An alternative is illustrated in FIG. 39 where the frequency of the microimage array $f_c$ is half that of the microlens array $f_{microlens}$. In this arrangement the resultant (moiré) image array $-(f_c-f_{microlens})$ has too high a frequency to be visible but the image array $(2f_c-f_{microlens})$ has a sufficiently low frequency to be visible resulting in a magnified $2^{nd}$ order moiré image. The resulting moiré image is of lower contrast since in each direction (horizontal and vertical) every other microlens is imaging a non-useful area. For this reason it is preferable to use low higher order moiré imaging (i.e. $2^{nd}$ or $3^{rd}$ order rather than $5^{th}$, $6^{th}$ or $7^{th}$ order etc). It is also possible to use non-integer higher order moiré imaging. Also, because of the nature of the convolution four images are viewed, in the case of a $2^{nd}$ order moiré, for every original microimage, illustrated in FIG. 40. This puts restrictions on the images that can be used without confusion. The potential overlap resulting from the additional imaging, illustrated in FIG. 40a, can be eliminated by rotating the microimage array, illustrated in FIG. 40b. In both FIGS. 40a and 40b the microlens array (not shown) is of the same frequency and orientation. The advantage of a device based on higher order moiré imaging is that a larger microimage can be used with a given microlens array, so potentially the device could be thinner.

Variation in Lens Focal Length

The speed at which the magnified image arrays appear to move in the above embodiment is dependent on how fast the focal point of the microlenses scans across the microimages with change of viewing angle. The scanning rate will vary with the distance between the microlens array and the microimage array. Reducing the back focal length and the distance between the microimages and microlenses (such that it equals the new focal length) in selective regions of the device will give regions where the images move less with angle than a region which has not been altered. Referring to FIG. 41 the magnified images of the bicycle will move slower than the magnified images of the ambulance because the microimage array of the bicycle is in an area the device, which is thinner, and the focal length of the corresponding microlenses are shorter.

Image Morphing

In a further embodiment, a design can be chosen to minimize the manufacturing sensitivity. The size of the moiré images is dependent on the magnitude of the vector $|f_{lens}-f_{image}|$. Since the size is determined solely by the magnitude, there is no restriction on the orientation—the orientation of the microlens and microimage arrays can be parallel (e.g. $f_o$ and $f_{microlens}$ in FIG. 32) or slightly rotated (e.g. $f_o$ and $f_{microlens}$ in FIG. 30) and result in the same size of magnified moiré image. This fact can be made use of to reduce manufacturing sensitivity so long as an appropriate design is chosen.

Figure 1:
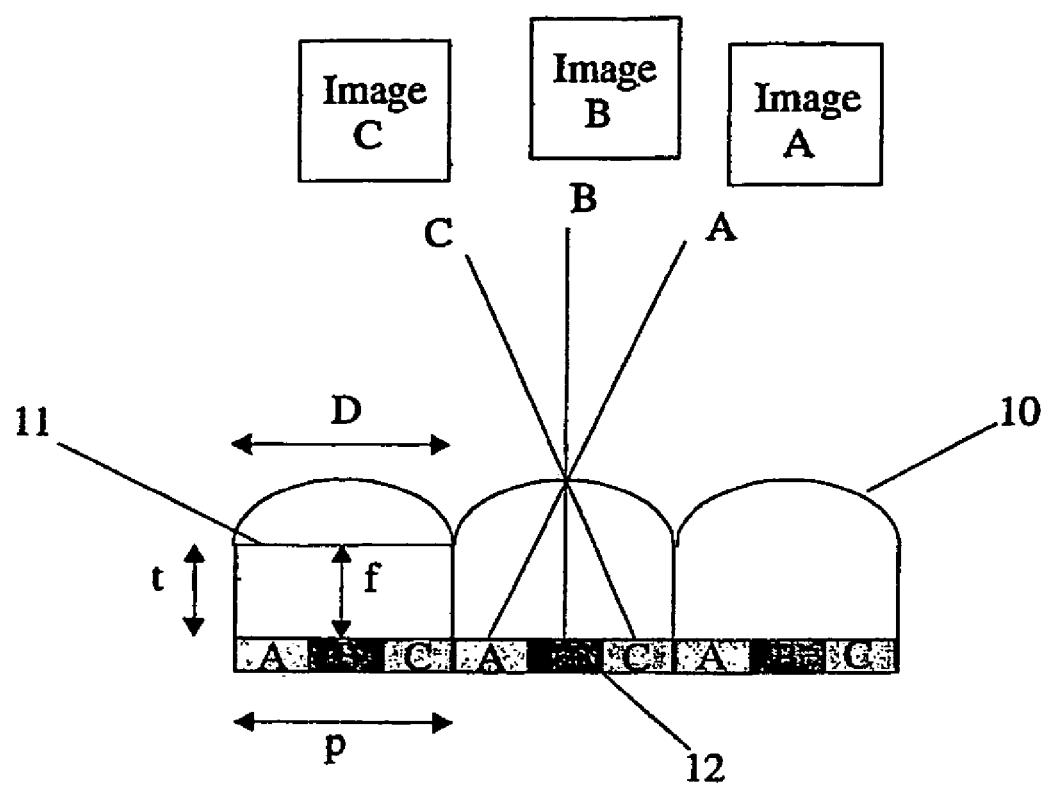
FIG. 1 illustrates schematically in cross-section a conventional microlens structure/microimage structure.
Figure 2:
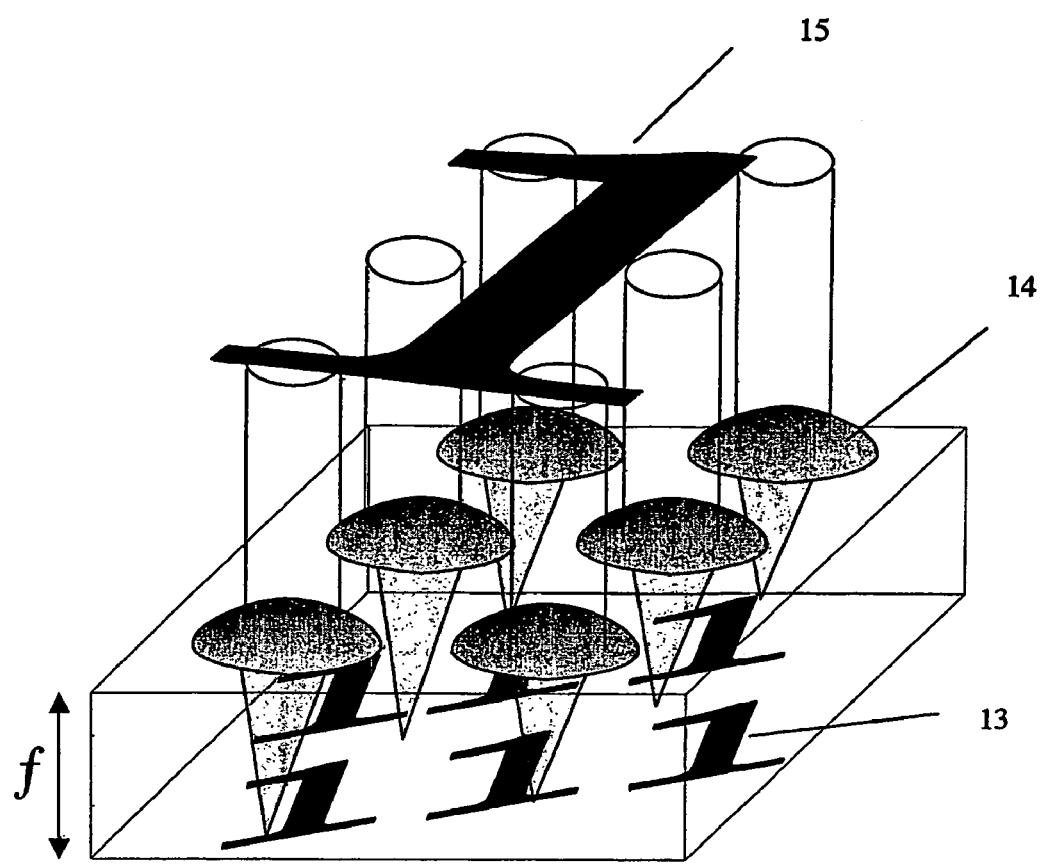
FIG. 2 illustrates schematically the effect of relative rotation between a microlens array and a microimage array.
Figure 3:
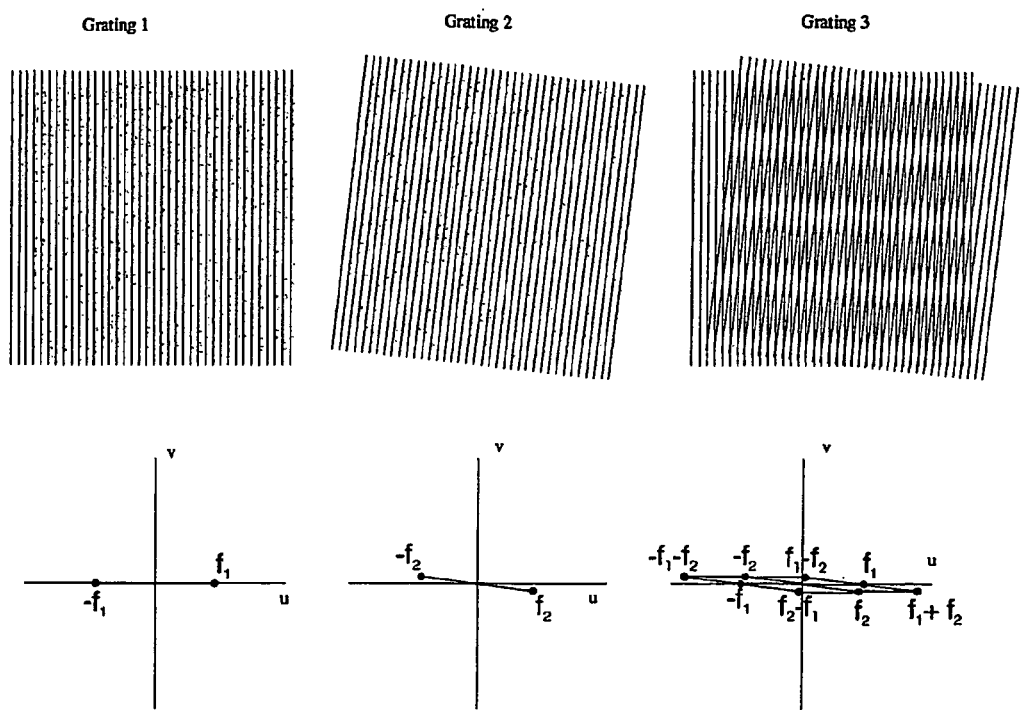
FIG. 3 illustrates a representation of two one-dimensional gratings, with the same frequency but different orientation as frequency vectors.

High magnifications require very small differences in array pitch or orientation or both. As a result, small variations in pitch or orientation can result in large changes in magnification and large changes in the orientation of the magnified moiré image as described in "The Moiré Magnifier", M. Hutley, R Hunt, R F Stevens and P Savander, Pure Appl. Opt. 3 (1994) 133-142 published by IOP Publishing Limited. Such orientation variations can be hidden by incorporating a deliberate variation in the image array, ie the orientation of the images in the array are deliberately varied. In one example the security device comprises one microimage array combined with one microlens array with substantially the same period but with a rotational misalignment such that an array of magnified images are generated. The array of magnified images contains fewer images than the respective microimage array. Each individual image in the magnified image array corresponds to a composite magnified image of all the microimages underneath, with each microlens magnifying a small section of the underlying image, as illustrated in FIG. 2. In this example the individual images within the microimage array are modified such that we have a slow rotation in the image across the array. The variation is such that it is imperceptible over an area of the microimage array contributing to one magnified image but noticeable over the whole array. FIG. 42 shows the array of magnified images 400 (maple leaves) each rotated with respect to its neighbour. On tilting the device an animation is observed as each magnified image rotates as it moves. With sufficient tilt each image will have moved/rotated so that the image in FIG. 42 is recreated at the tilted viewing position. The additional rotation makes the device more distinctive and secure. Additionally, changing the shape of the images can also mask variations in orientation and magnification across the device as it is easier to see variations in a uniform array.

The invention claimed is:

1. A security device comprising a substrate having an array of microlenses on one side and one or more corresponding arrays of microimages on the other side, the microimages being located at a distance from the microlenses substantially equal to the focal length of the microlenses, the substrate being sufficiently transparent to enable light to pass through the microlenses so as to reach the microimages characterized in that each microimage is defined by an anti-reflection structure on the substrate formed by a periodic array of identical structural elements and an at least partially reflecting layer on the same side of the substrate as the anti-reflection structure, the anti-reflection structure reducing the reflective property of the reflecting layer, wherein one or both of the anti-reflection structure and the at least partially reflecting layer is in the shape of a microimage, whereby light passing through the substrate and impinging on the microimages is reflected to a different extent than light which does not impinge on the microimages thereby rendering the microimages visible.

2. A device according to claim 1, wherein the anti-reflection structure positively defines each microimage, the at least partially reflecting layer defining a background.

3. A device according to claim 2, wherein the at least partially reflecting layer extends over the anti-reflection structure.

4. A device according to at least claim 3, wherein the at least partially reflecting layer is provided substantially uniformly over the anti-reflection structure.

5. A device according to claim 4, wherein the at least partially reflecting layer extends substantially uniformly over the substrate surface.

6. A device according to claim 1, wherein the microimages are defined by discrete anti-reflection structural portions of the anti-reflection structure.

7. A device according to claim 6, wherein the microimage defining portions of the anti-reflection structure are located adjacent areas that do not have an anti-reflective property.

8. A device according to claim 1, wherein the anti-reflection structure defines each microimage in a negative form.

9. A device according to claim 8, wherein the at least partially reflecting layer fills each microimage.

10. A device according to claim 1, wherein the anti-reflection structure extends substantially uniformly across the security device, the reflecting layer being provided discontinuously so as to define the microimages.

11. A device according to claim 1, wherein the at least partially reflecting layer is opaque to optical light.

12. A device according claim 1, wherein the at least partially reflecting layer includes additional non-reflecting and/or transparent regions defining additional indicia.

13. A device according to claim 1, wherein the at least partially reflecting layer comprises a metal layer.

14. A device according to claim 13, wherein the metal layer has been vacuum metallized.

15. A device according to claim 1, wherein the at least partially reflecting layer is a high refractive index material, such as ZnS.

16. A device according claim 1, wherein the substrate acts as the at least partially reflecting layer.

17. A device according to claim 1, wherein the anti-reflection structure has a period of less than 700 nm.

18. A device according to claim 17, wherein the anti-reflection structure has a period of 200-400 nm.

19. A device according to claim 17, wherein the anti-reflection structure has a height greater than 150 nm, preferably a height in the range 250-350 nm.

20. A device according to claim 17, wherein the anti-reflection structure is a two dimensional array.

21. A device according to claim 1, wherein the anti-reflection structure comprises a surface layer in which the refractive index varies gradually from unity to the refractive index of the substrate.

22. A device according to claim 1, wherein the anti-reflection structure is a moth-eye structure.

23. A device according to claim 22, wherein individual elements of the moth-eye structure have a width to height ratio up to 1:2, preferably in the range 1:1.08-1:2.

24. A device according to claim 1, wherein the substrate comprises a single layer.

25. A device according to claim 1, wherein the substrate comprises two or more layers.

26. A device according to claim 1, wherein the substrate is made from a clear polymeric film.

27. A device according to claim 26, wherein the polymeric film comprises one of polyethylene teraphthalate (PET), polyamide, polycarbonate, polyvinylchloride (PVC), polyvinylidenechloride (PVdC), polymethylmethacrylate (PMMA), polyethylene naphthalate (PEN), and polypropylene.

28. A device according to claim 1, wherein the thickness of the substrate is in the range 1-50 microns, preferably 10-30 microns.

29. A device according to claim 1, wherein the microlenses are chosen from spherical lenslets, cylindrical lenslets, piano-convex lenslets, double convex lenslets, fresnel lenslets and fresnel zone plates.

30. A device according to claim 29, wherein each lens has a diameter in the range 1-50 microns, preferably 10-30 microns.

31. A device according to claim 1, wherein the microlenses abut one another.

32. A device according to claim 1, wherein an opaque mask is provided around the edge of each microlens.

33. A device according to claim 1, wherein the microlenses are defined by a gradient refractive index layer.

34. A device according to claim 1, wherein the microlenses and microimages are substantially in register with one another.

35. A device according to claim 34, wherein the microlenses and microimages are in substantially perfect rotational alignment but with a small pitch mismatch.

36. A device according to claim 35, wherein the pitch mismatch is in the range 0.1%-25%, preferably 0.2%-4%.

37. A device according to claim 34, wherein the microlenses and microimages have a small rotational misalignment but substantially identical pitches.

38. A device according to claim 37, wherein the rotational misalignment is in the range 0.05°-15°, preferably 0.10-2°.

39. A device according to claim 1, comprising at least 100 microlenses and corresponding microimages.

40. A device according to claim 1, further comprising a holographic structure superimposed on the microlenses.

41. A security substrate on or in which is provided a security device according to claim 1.

42. A substrate according to claim 41 made of paper or plastics.

43. A substrate according to claim 41, wherein the security device is provided in a transparent window of the substrate.

44. A document comprising a security substrate according to claim 41, the document comprising a document of value such as a banknote, travelers cheque, certificate of authenticity, stamp, bond, tax disc, fiscal stamp, secure label, passport or voucher.

45. A transfer foil comprising a carrier to which is removably secured one or more security devices according to claim 1.

46. A security thread incorporating a security device according to claim 1.

* * * * *